United States Patent
Jamieson

(10) Patent No.: US 8,042,825 B2
(45) Date of Patent: *Oct. 25, 2011

(54) TRAILER TOWING SYSTEM

(76) Inventor: Joseph P. Jamieson, Denton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,256

(22) Filed: Apr. 15, 2010

(65) Prior Publication Data

US 2010/0194074 A1 Aug. 5, 2010

Related U.S. Application Data

(63) Continuation of application No. 11/743,056, filed on May 7, 2007, which is a continuation-in-part of application No. 11/249,100, filed on Oct. 12, 2005, now Pat. No. 7,497,457.

(60) Provisional application No. 60/617,836, filed on Oct. 12, 2004.

(51) Int. Cl.
*B60D 1/42* (2006.01)
(52) U.S. Cl. ................... 280/460.1; 280/476.1
(58) Field of Classification Search ............... 280/460.1, 280/476.1, 441.2, 503
See application file for complete search history.

(56) References Cited

U.S. PATENT DOCUMENTS

| | | | | | |
|---|---|---|---|---|---|
| 1,993,591 | A | * | 3/1935 | Carpenter et al. | 280/460.1 |
| 2,225,130 | A | * | 12/1940 | Otto et al. | 280/487 |
| 3,433,518 | A | * | 3/1969 | Foltz | 292/238 |
| 3,837,677 | A | * | 9/1974 | Haskins | 280/476.1 |
| 4,723,473 | A | * | 2/1988 | Grinwald | 89/1.13 |
| 4,856,804 | A | * | 8/1989 | Nash | 280/430 |
| 5,078,438 | A | * | 1/1992 | Bieganski | 292/235 |
| 5,116,090 | A | * | 5/1992 | Nichandros | 292/236 |
| 5,382,041 | A | * | 1/1995 | Keith | 280/476.1 |
| 5,599,035 | A | * | 2/1997 | Spence | 280/414.1 |
| 5,655,801 | A | * | 8/1997 | Casey | 292/210 |
| 2002/0003051 | A1 | * | 1/2002 | Ishii et al. | 180/53.6 |

* cited by examiner

*Primary Examiner* — Tony H. Winner

(57) ABSTRACT

An accessory towing apparatus that connects a towing vehicle to a gooseneck-type trailer. The accessory towing apparatus includes a chassis framework assembly mounted on an axle having two ground engaging wheels. The chassis assembly includes three linkage arms, which are attached to and extend from the framework. The ends of the three linkage arms are designed to engage and couple with three brackets attached to the main frame of the towing vehicle. When the respective coupling mechanism of the three linkage arms are each engaged, they are substantially parallel to one another and pivot about a substantially common axis. An automatic alignment and attachment system may also be included to greatly simplify the attachment process of the gooseneck-type trailer to the towing vehicle.

20 Claims, 16 Drawing Sheets

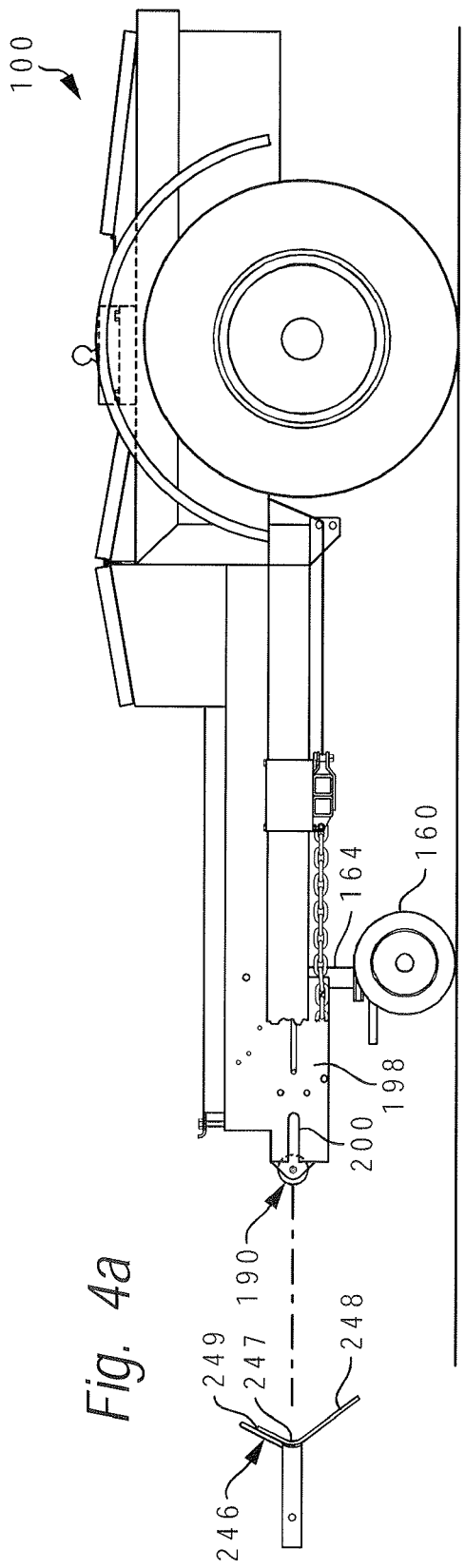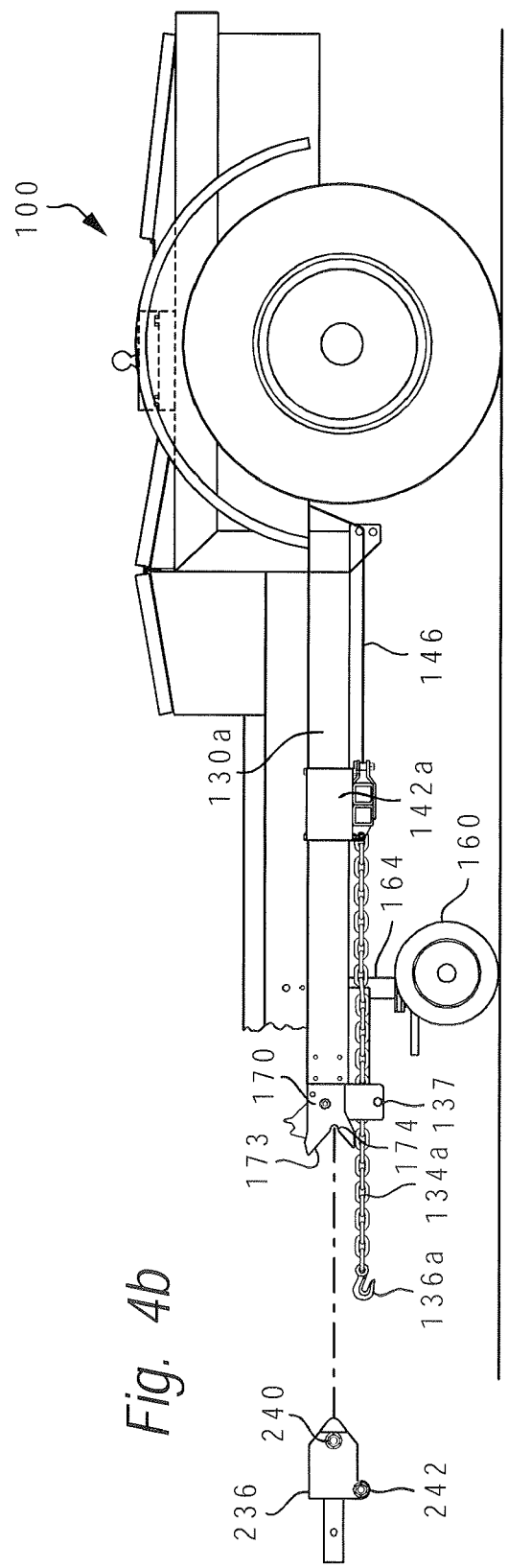

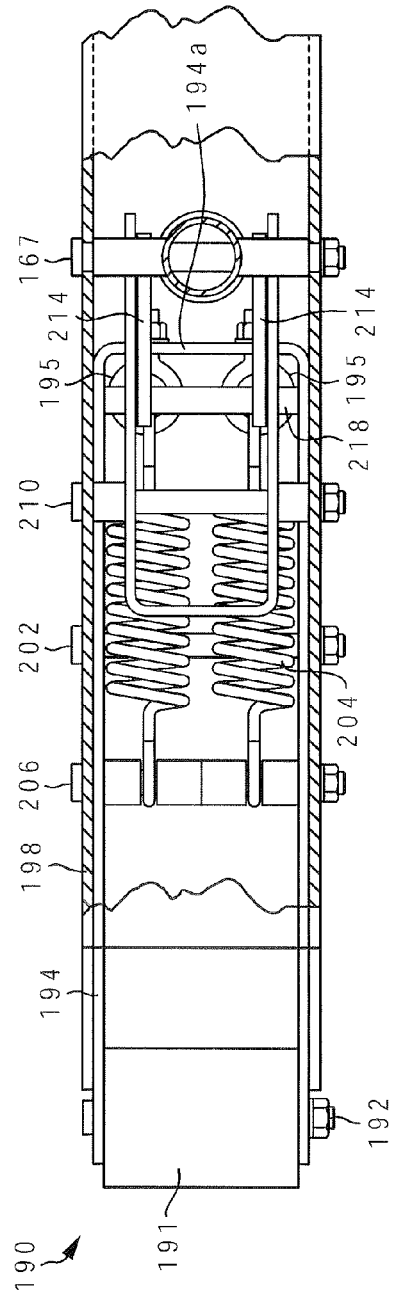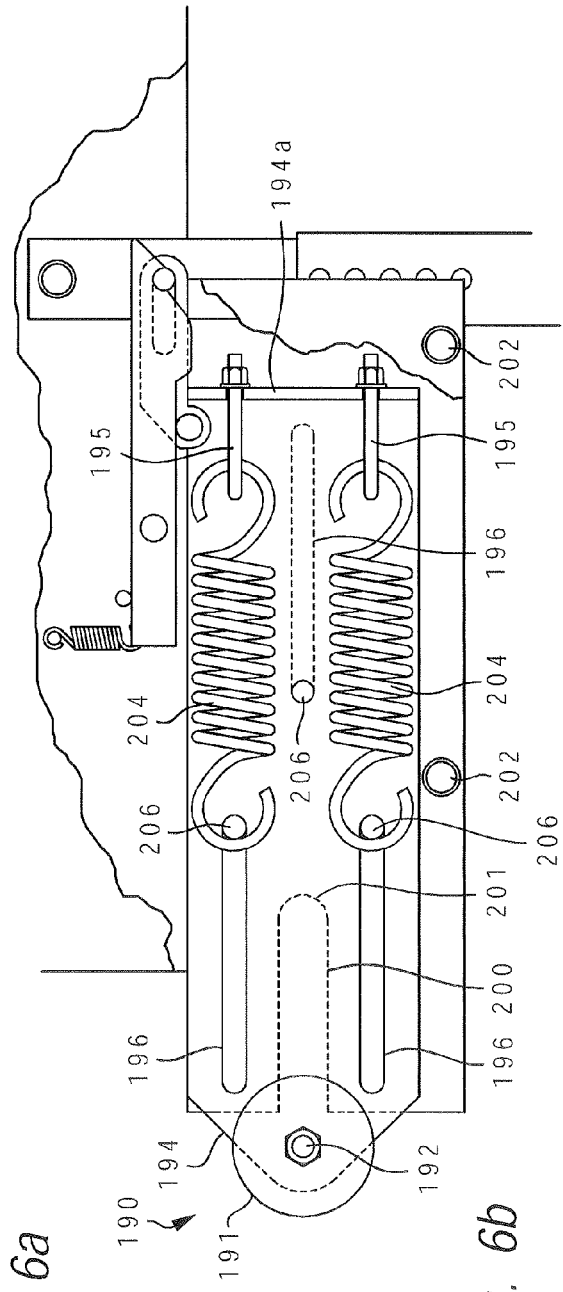
Fig. 6a
Fig. 6b

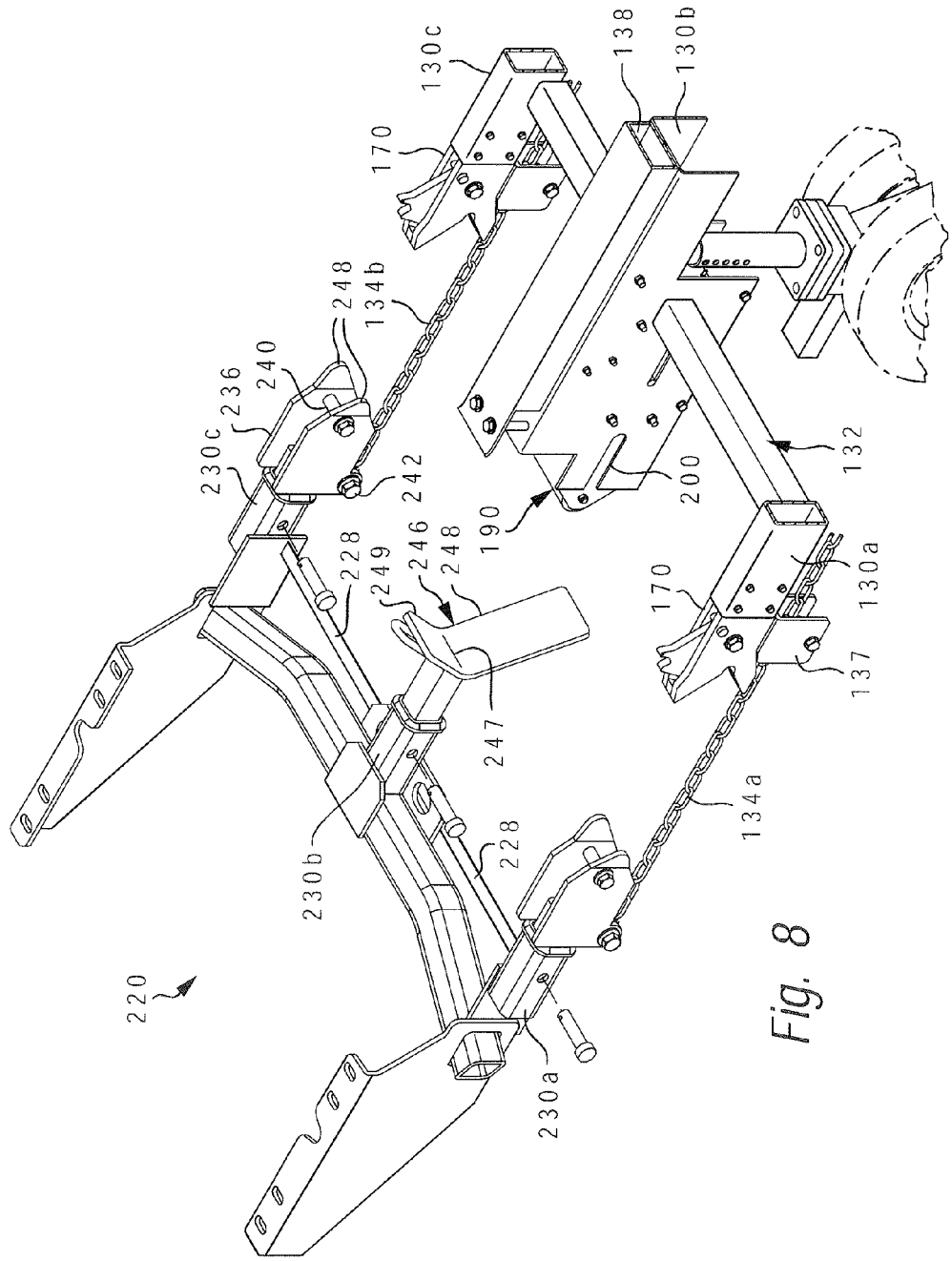

TRAILER TOWING SYSTEM

CROSS-REFERENCE TO RELATED APPLICATION

This application is a continuation of U.S. patent application Ser. No. 11/743,056 filed on May 7, 2007, which is a continuation-in-part of U.S. patent application Ser. No. 11/249,100 filed on Oct. 12, 2005 now U.S. Pat. No. 7,497,457, which claims the benefit of and priority to a U.S. Provisional Patent Application No. 60/617,836 filed Oct. 12, 2004, the technical disclosure of which is hereby incorporated herein by reference.

BACKGROUND OF THE INVENTION

1. Technical Field

The present invention relates to a trailer towing system and more particularly to an improved towing apparatus used to connect a towing vehicle and a gooseneck-type trailer, whereby the improved towing apparatus enhances the utility, stability, maneuverability and safety of the hitched vehicle and trailer.

2. Description of the Related Art

As shown in FIG. 1a, a towing mechanism such as a simple bumper hitch 12 is frequently added to a vehicle 10 for the purpose of towing a trailer 20. However, such a bumper pull trailer can oftentimes place an excessive vertical load on the back end of the towing vehicle 10. Moreover, such draw bar trailers have inherent stability and weight transfer problems due to the towing pivot point being positioned behind the rear axle of the towing vehicle 10.

A more recent innovation in trailer towing systems includes what are commonly referred to as gooseneck trailer rigs and fifth wheel recreational vehicle (RV) trailers (hereinafter referred to collectively as "gooseneck-type trailers"). As shown in FIG. 1b, gooseneck trailer rigs typically include a trailer 50 having an extended forward section with a vertical tongue 52 extending therefrom. The vertical tongue 52 is adapted to be coupled to a hitch mechanism 44, which is secured to and supported by a suitable frame mechanism attached to the bed 42 of a pick-up truck 40. The hitch mechanism 44 is typically mounted onto the bed of the truck above and slightly forward of its rear axle. A coupler mechanism, located at a distal end of the vertical tongue 52, pivotally attaches the vertical tongue 52 to a fixed ball portion of the hitch mechanism 44.

Fifth wheel RV trailers are very similar to gooseneck trailer rigs but have much shorter vertical tongues and typically require a raised hitch mechanism on the tow vehicle. While a gooseneck trailer hitch usually includes a ball hitch mechanism mounted onto the bed of the towing vehicle and a corresponding coupler mechanism on the distal end of the vertical tongue, the fifth wheel hitch mechanism typically comprises a hitch plate mechanism mounted onto the bed of the towing vehicle and operable for receiving a disc-shaped coupler on the end of the vertical tongue commonly referred to as a kingpin.

Gooseneck-type trailer systems offer a number of advantages over the bumper pulled or draw bar trailers. By virtue of its geometry, a gooseneck-type trailer rig is typically able to safely tow greater loads than a similarly sized bumper pulled trailer because the load is passed directly onto the rear axle of the truck instead of onto the bumper. Moreover, by positioning the pivot point of the trailer nearly over the rear axle, gooseneck type trailer rigs distribute the load more evenly over the tow vehicle, causing less wear and tear on the tow vehicle and a smoother ride. In addition, gooseneck type trailer rigs also offer a smaller turning radius.

While current gooseneck type trailer rigs offer improved stability over bumper pull trailers, they also have several disadvantages. In general, gooseneck type trailer rigs are only suitable for use with a pick-up truck style towing vehicle. Moreover, the storage capacity of the pick-up bed is greatly diminished while the gooseneck type rig is attached to the towing vehicle. In addition, when detached from the towing vehicle, supporting legs or jack stands must be extended to support the forward portion of the trailer rendering the gooseneck type trailer essentially immobile. The reattachment of the gooseneck type trailer to a towing vehicle can also be inordinately complex and difficult. What is needed is an improved trailer towing system which fully exploits the usefulness of the gooseneck type trailer while minimizing its inherent shortcomings.

Another problem area with all trailer towing systems involves braking. While four wheel brakes are mandatory for vehicles and combinations of vehicles over 10,001 lbs., many lighter trailers have no brakes. This is particularly critical with regard to gooseneck type trailers, which are typically larger. With insufficient or no brakes, a trailer will push against the tow vehicle every time it decelerates to stop. Moreover, if there is a sway, the trailer can jackknife because there is nothing to control it. Thus, larger trailers are typically equipped with rudimentary braking systems. There are basically three types of trailer braking systems currently available: electronically controlled electric brakes, hydraulically controlled electric brakes, and surge hydraulic brakes. Electronically controlled electric brakes provides automatic and manual control of electric trailer brakes and require the towing vehicle to be equipped with controlling device and additional wiring for electrical power. Hydraulically controlled electric brakes are electric brakes which are applied in proportion to brake pedal pressure applied in the towing vehicle. Surge brakes are independent hydraulic brakes activated by a master cylinder at the junction of the hitch and trailer. Thus, current trailer braking systems are highly dependent upon the towing vehicle for either electrical power or hydraulic power. Therefore, a need exists for an improved trailer towing system having enhanced braking and stability capabilities. Moreover, it would be desirable to produce an improved trailer towing system having an independent trailer braking capability and providing enhanced stability to the both the trailer and the towing vehicle.

SUMMARY OF THE INVENTION

The present invention overcomes many of the disadvantages of prior art towing systems by allowing gooseneck-type trailers to be towed by a variety of motor vehicles. Moreover, the present invention allows a gooseneck-type trailer to be towed without diminishing the storage capacity of the towing vehicle. In addition, the present invention improves the stability and mobility of a gooseneck-type trailer, both while attached to and detached from the towing vehicle. Furthermore, the present invention includes a novel apparatus and method that greatly simplifies the reattachment process of the gooseneck-type trailer to the towing vehicle.

The improved system includes an accessory towing apparatus used to connect the towing vehicle and gooseneck-type trailer. The accessory towing apparatus effectively extends the towing vehicle's wheelbase thereby enhancing stability and control. Moreover, when properly secured, the axle of the accessory towing apparatus is aligned parallel with the traction axle of the towing vehicle further enhancing the stability and control of the towing assembly. The accessory towing apparatus also prevents the overloading of the back end of the towing vehicle, which can induce poor steering and traction control, and braking ability. Indeed, by absorbing the vertical load of the gooseneck-type trailer, the accessory towing apparatus allows a smaller sized towing vehicle to be used safely.

In one embodiment, the accessory towing apparatus includes a chassis or framework assembly mounted to an axle having at least two ground engaging wheels. The chassis includes three linkage arms, which are attached to and extend from the framework assembly. The distal ends of the three linkage arms each include coupling mechanisms which are designed to engage complimentary coupling mechanisms connected to the main frame of the towing vehicle. When the respective coupling mechanism of the three linkage arms are each engaged, they are substantially parallel to one another and pivot about a substantially common axis. In one embodiment, the coupling mechanisms comprise heavy-duty gate latching mechanisms, which couple with horizontal gate rod assemblies attached to the main frame of the towing vehicle. Each gate latching mechanism includes a latch assembly partially enclosed within and pivotally attached to a bracket assembly having a V-shaped groove for accepting the horizontal gate rod assembly. The latch assembly may further include a number of notches, which allow the latching mechanism to be secured in either an opened or closed position.

In another embodiment, the accessory towing apparatus may further include an automatic alignment and attachment system. The alignment and attachment system comprises two lengths of cable or chain, which are aligned with the two outboard linkage arms and connected to a winch mechanism. The loose or distal ends of the chains are operable for selective attachment to the main frame of the towing vehicle.

In a preferred embodiment, the two lengths of cable or chain are connected to a common yoke mechanism, which is slidably coupled to each of the two outboard linkage arms and connected to a single winch mechanism. The winch mechanism is preferably a ratcheting winch mechanism that is self-contained and integral to the accessory towing apparatus and may be powered and controlled mechanically, electrically, hydraulically or any combination thereof. The two chains or cables are of equal length and adequately spaced apart, such that when the cables are attached to a tow vehicle the centerline of the accessory towing apparatus (and correspondingly, the trailer) is aligned with the centerline of the tow vehicle by simply driving the tow vehicle straight forward a short distance. The winch mechanism may then be used to draw and guide the ends of three linkage arms into their respective coupling attachments attached to the towing vehicle.

In a preferred embodiment of the automatic alignment and attachment system, the latching mechanisms on the two outboard linkage arms comprise the heavy-duty gate latching mechanism described previously, while the latching mechanism for the center linkage arm comprises a compression latch mechanism, which, in conjunction with a roller ramp assembly attached to the tow vehicle, assists in aligning the coupling mechanisms on the linkage arms with their respective attachment points on the towing vehicle. This embodiment is particularly useful when attaching the accessory towing apparatus on uneven ground.

Moreover, the accessory towing apparatus may further comprise a secondary or accessory winch having a longer cable that is operable for providing a self-extraction capability. For example, when the trailer is positioned in a sandy or soggy area having poor traction, the towing vehicle can be positioned on solid footing and the secondary winch may be used to pull the accessory towing apparatus and trailer towards the towing vehicle. When the trailer is close enough to the towing vehicle, the cables of the alignment and attachment system may then be connected to draw and guide the ends of three linkage arms the remaining distance into their respective latching mechanisms.

In accordance with another feature of the invention, the accessory towing apparatus may further comprise a novel automatic wheel retraction/extension system. The wheel retraction/extension system actuates in conjunction with a compression latch mechanism to automatically retract and extend a jockey wheel assembly. The compression latch mechanism is mechanically linked with the jockey wheel assembly that is pivotally attached to a linkage arm of the accessory towing apparatus. As the compression latch mechanism is compressed into its sleeve housing, an attached cam mechanism induces a torquing moment on the jockey arm assembly causing it to rotate about its pivot point. The compression latch mechanism is biased as it is compressed into its sleeve housing, so that when the accessory towing apparatus is disengaged from the towing vehicle, the compression latch mechanism automatically expands out of its sleeve housing, thereby causing the jockey wheel assembly to automatically extend. The compression latch mechanism may also include a biased interlock mechanism for preventing the jockey wheel from retracting whenever the accessory towing apparatus is detached from the towing vehicle Another feature of the invention comprises a novel receiver hitch mechanism attached to the framework of the towing vehicle. The receiver hitch mechanism includes a framework, which is securely attached to the chassis frame of a towing vehicle, and three receiver sockets or boxes, which are co-aligned along a common axis. The receiver sockets are each operable to selectively receive a latching mechanism. A retention bolt may be utilized to selectively attach each latching mechanism to its respective receiver socket. Thus, when not in use, the various latching mechanisms may be removed from their respective receiver sockets for safe keeping.

In accordance with another feature of the invention, the axle assembly may also include a power take off mechanism to power a hydraulic pump assembly, a vacuum pump assembly, and/or an accessory electrical generator. The independent hydraulic and vacuum pump assembly enables the accessory towing apparatus to provide hydraulic braking power to all trailer wheels that is independent of the towing vehicle's hydraulic braking system. In addition, the accessory hydraulic pump can be used to charge a hydraulic pressure accumulator thereby providing accessory hydraulic power for a hydraulic powered ratcheting winch mechanism. Likewise, the electrical generator enables the accessory towing apparatus to provide accessory electrical power to itself and the trailer that is independent of the towing vehicle's electrical system. Additionally, the accessory electrical generator can be used to charge an accessory battery on the accessory towing apparatus, which can supply emergency or back-up electrical power to the towing vehicle.

Thus, the accessory towing apparatus of the present invention offers a number of advantages over previous towing apparatus. The accessory towing apparatus effectively extends the towing vehicle's wheelbase thereby enhancing stability and control. Moreover, it eliminates the overloading of the back end of the towing vehicle that induces poor steering control and braking ability. Indeed, by absorbing the vertical load of the gooseneck-type trailer, the accessory towing apparatus allows a smaller sized towing vehicle to be safely used. Furthermore, it adds an additional axle to aid in braking.

BRIEF DESCRIPTION OF THE DRAWINGS

A more complete understanding of the method and apparatus of the present invention may be had by reference to the following detailed description when taken in conjunction with the accompanying drawings, wherein:

FIG. 3b is cut-away perspective view of the accessory towing apparatus of the present invention shown in FIG. 3a;

FIG. 3c is an overhead plan view of the accessory towing apparatus of the present invention shown in FIG. 3 a;

FIG. 3d is a side view of the accessory towing apparatus of the present invention shown in FIG. 3 a;

FIG. 4a is a cross-sectional view of the accessory towing apparatus of the present invention shown in FIG. 3c taken along line 4a-4a;

FIG. 4b is a cross-sectional view of the accessory towing apparatus of the present invention shown in FIG. 3c taken along line 4b-4b;

FIG. 6a is a cut-away overhead view of the compression latch mechanism of the accessory towing apparatus of the present invention;

FIG. 6b is a cut-away side view of the compression latch mechanism of the accessory towing apparatus of the present invention;

FIG. 8 is a perspective view illustrating the use of the automatic aligning system of the accessory towing apparatus of the present invention.

Figure 1A:
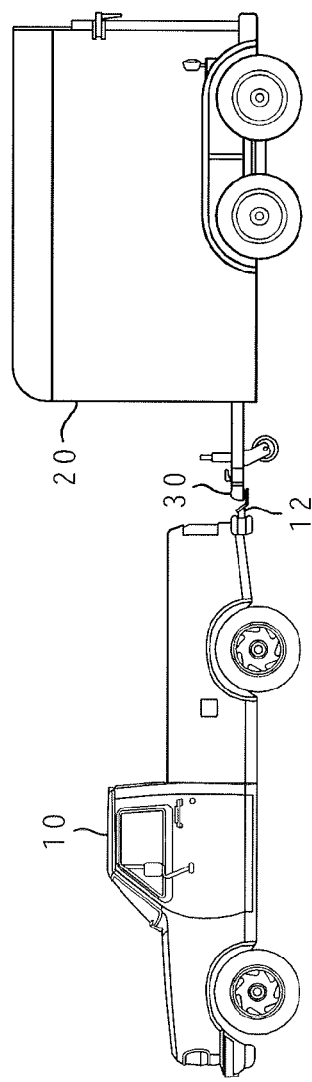
FIG. 1a is a side view of a prior art bumper hitch towing system.
Figure 1B:
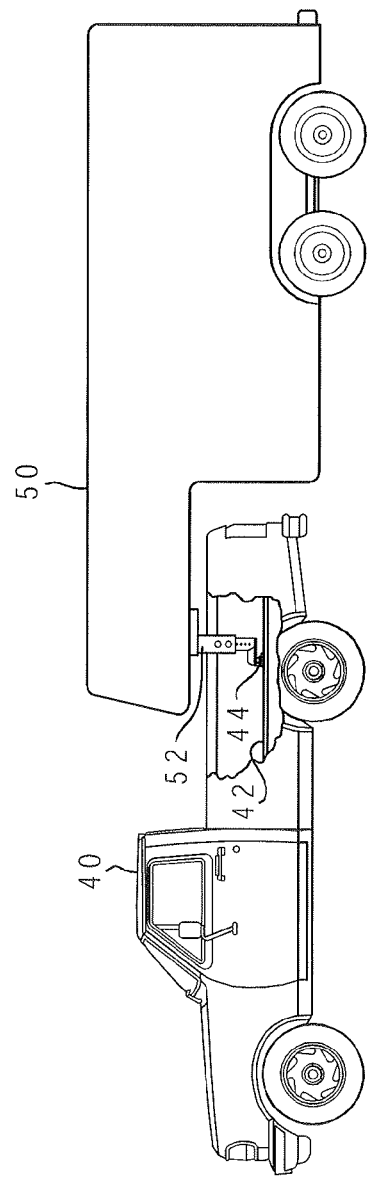
FIG. 1b is a side view of a prior art gooseneck-type towing system.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
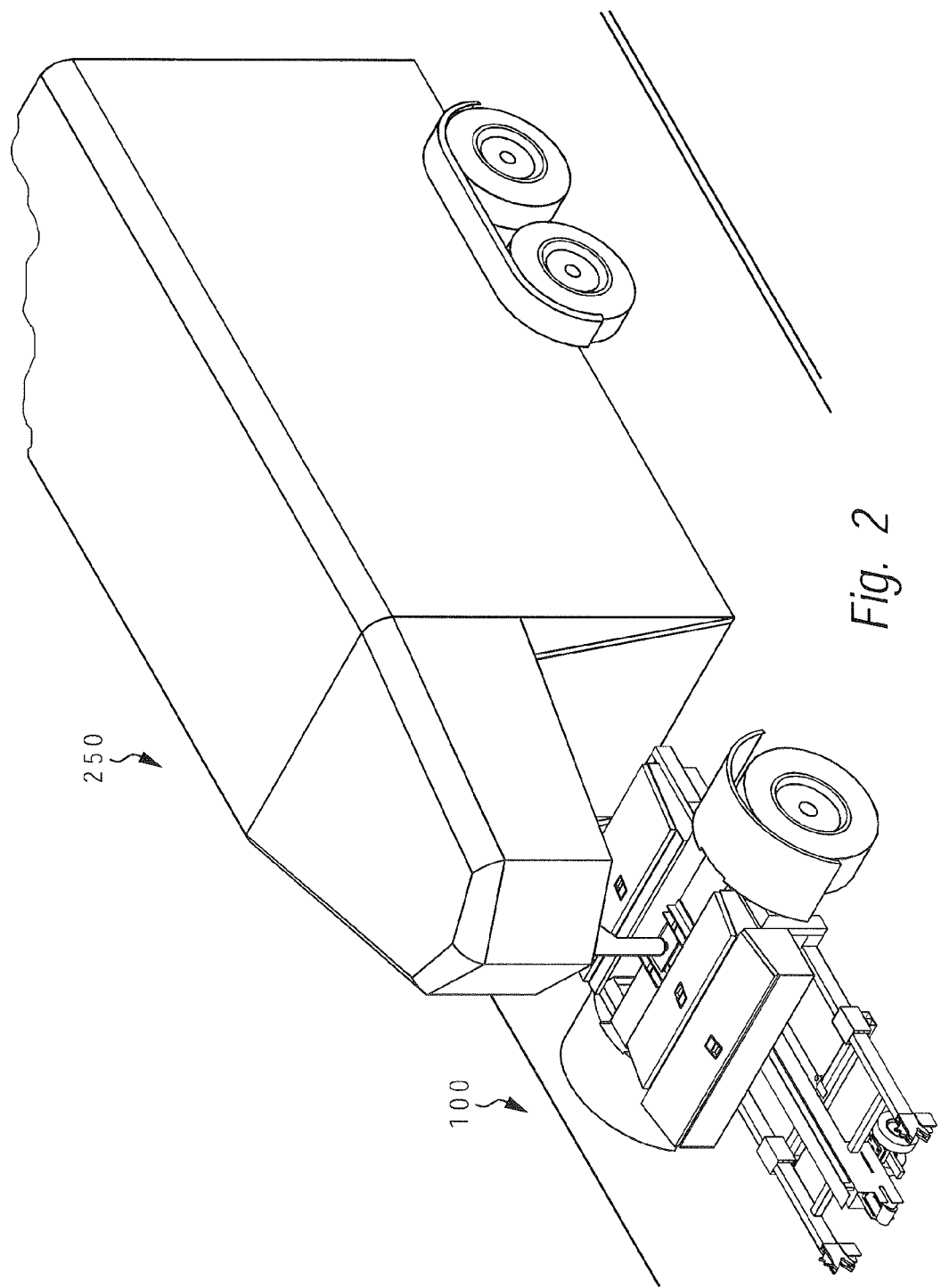
FIG. 2 is perspective view of the improved trailer towing system of the present invention.

As shown in FIG. 2, the improved trailer towing system of the present invention comprises an accessory towing apparatus 100 used to connect a towing vehicle with a gooseneck-type trailer 250. When attached to a gooseneck-type trailer 250, the accessory towing apparatus 100 becomes essentially integral with the gooseneck-type trailer 250, so that, when detached from the towing vehicle, the gooseneck-type trailer 250 no longer needs jack stands to remain upright.

As shown in the Figures and in greater detail in FIGS. 3a-3d, the accessory towing apparatus 100 includes a towing chassis assembly mounted on an axle assembly 102 having at least two ground engaging wheels 104 attached thereto. The chassis assembly includes a main framework assembly 110 mounted over the axle assembly 102 and three linkage arms 130a, 130b, 130c attached to and extending from the main framework assembly 110. A plurality of storage boxes 114, 116, 118 may also be mounted to or incorporated into the framework assembly 110. In the embodiment shown, the main framework assembly 110 is mounted on a suspension system 103 attached to the axle assembly 102. While a leaf spring system is depicted, it is understood that the suspension system 103 may also comprise coil springs, air springs, struts, anti-sway bars and/or shock absorbers.

The axle assembly 102 may further comprise ground engaging wheels 104 having a fixed alignment or a dynamically alignment (i.e., are steerable). Moreover, the wheels 104 may freely rotate independent of one another or be connected via a differential mechanism 107. In a preferred embodiment the axle assembly 102 comprises a dynamically aligned or steerable axle assembly, which allows the wheels 104 to pivot relative to the axle assembly 102. At high speeds, a steerable axle assembly allows the wheels 104 to turn slightly in the same direction as the front wheels of the towing vehicle, which greatly improves tracking of the trailer. But at slow speeds, the steerable axle assembly enables the wheels 104 to pivot as much as 23°±1° to the left and 31°±1° to the right in the opposite direction of the front wheels of the towing vehicle. This permits the towing vehicle and attached trailer to make a tighter coordinated turns, such as when cornering or getting into a tight parking space. Moreover, when attached to the towing vehicle, the accessory towing apparatus having a steerable or dynamic axle assembly prevents tire scuffing and enables coordinated turns by automatically sensing the turning rates and forces generated by the towing vehicle's steering mechanism. The steerable axle maintains its alignment with the drive axle of the towing vehicle, thereby enabling the wheels of the accessory towing apparatus to follow the track of the rear axle wheels of the towing vehicle instead of cutting to the inside of the turn. This results in greater maneuverability and improved stability while driving.

In addition, the axle assembly 102 may further comprise a power take-off mechanism 108 for powering accessory systems. The power take-off mechanism 108 may be used to power a hydraulic pump assembly, a vacuum pump assembly, and/or an accessory electrical generator. As shown in the FIG. 3b, in one embodiment the axle assembly includes a power take off mechanism 108 attached to the differential 107, that that powers an accessory power mechanism 106. The power generated by the accessory power mechanism 106 is supplied to appropriate accessory systems located on the accessory towing apparatus 100 and/or the attached trailer 250. In one embodiment, the accessory power mechanism 106 comprises a hydraulic pump assembly. In another embodiment, the accessory power mechanism 106 comprises an electrical generator. An independent hydraulic or vacuum pump assembly enables the accessory towing apparatus to provide hydraulic braking power to all trailer wheels that is independent of the towing vehicle's hydraulic system. In addition, an accessory hydraulic pump can be used to charge a hydraulic pressure accumulator (not shown) thereby providing a source of hydraulic power for a hydraulically powered ratcheting winch mechanism. Likewise, an electrical generator could enable the accessory towing apparatus to provide accessory electrical power to itself and the trailer that is independent of the towing vehicle's electrical system. Additionally, an accessory electrical generator could charge an accessory battery (not shown) on the accessory towing apparatus.

The main framework 110 of the accessory towing apparatus 100 further includes a planar surface or saddle 120 upon which a hitch mechanism 124 is mounted. The hitch mechanism 124 is typically centered upon the saddle 120. While a ball hitch mechanism 124 is shown in the illustrations, it is understood that the hitch mechanism 124 may alternatively comprise a mechanism commonly known as a fifth-wheel hitch. Moreover, the saddle 120 may further comprise a structural extension framework 122, which extends the hitch mechanism 124 vertically above the saddle 120.

The saddle 120 is designed to straddle the longitudinal rails 112 of the main framework assembly 110 and is generally positioned over the axle assembly 102. In one embodiment, the saddle 120 is permanently affixed to the main framework assembly 110 through welding or other similar means. However, in a preferred embodiment the saddle 120 is selectively affixed to the main framework assembly 110 by means a bolt assembly.

Figure 3A:
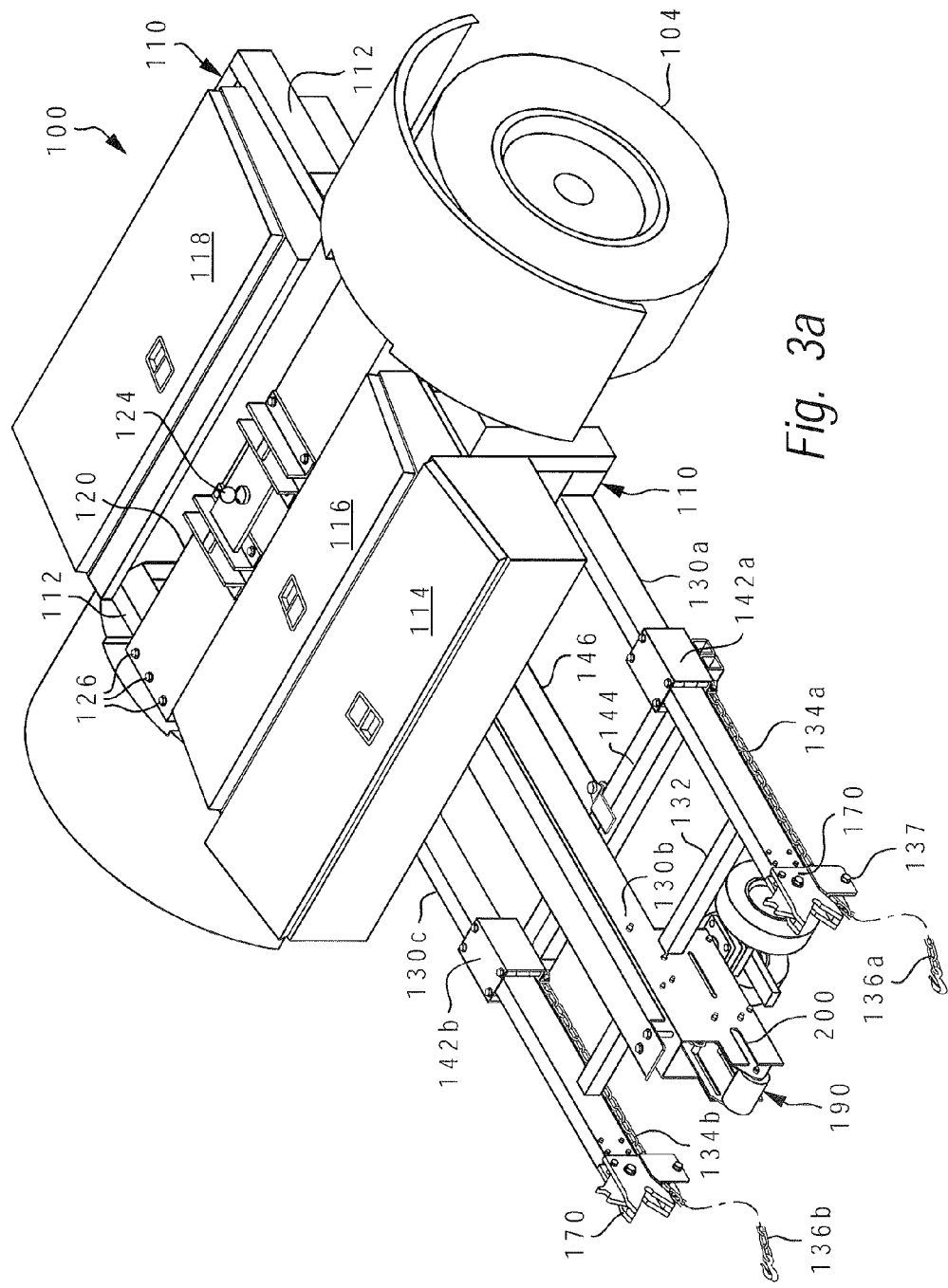
FIG. 3a is a perspective view of the accessory towing apparatus of the present invention.
Figure 3B:
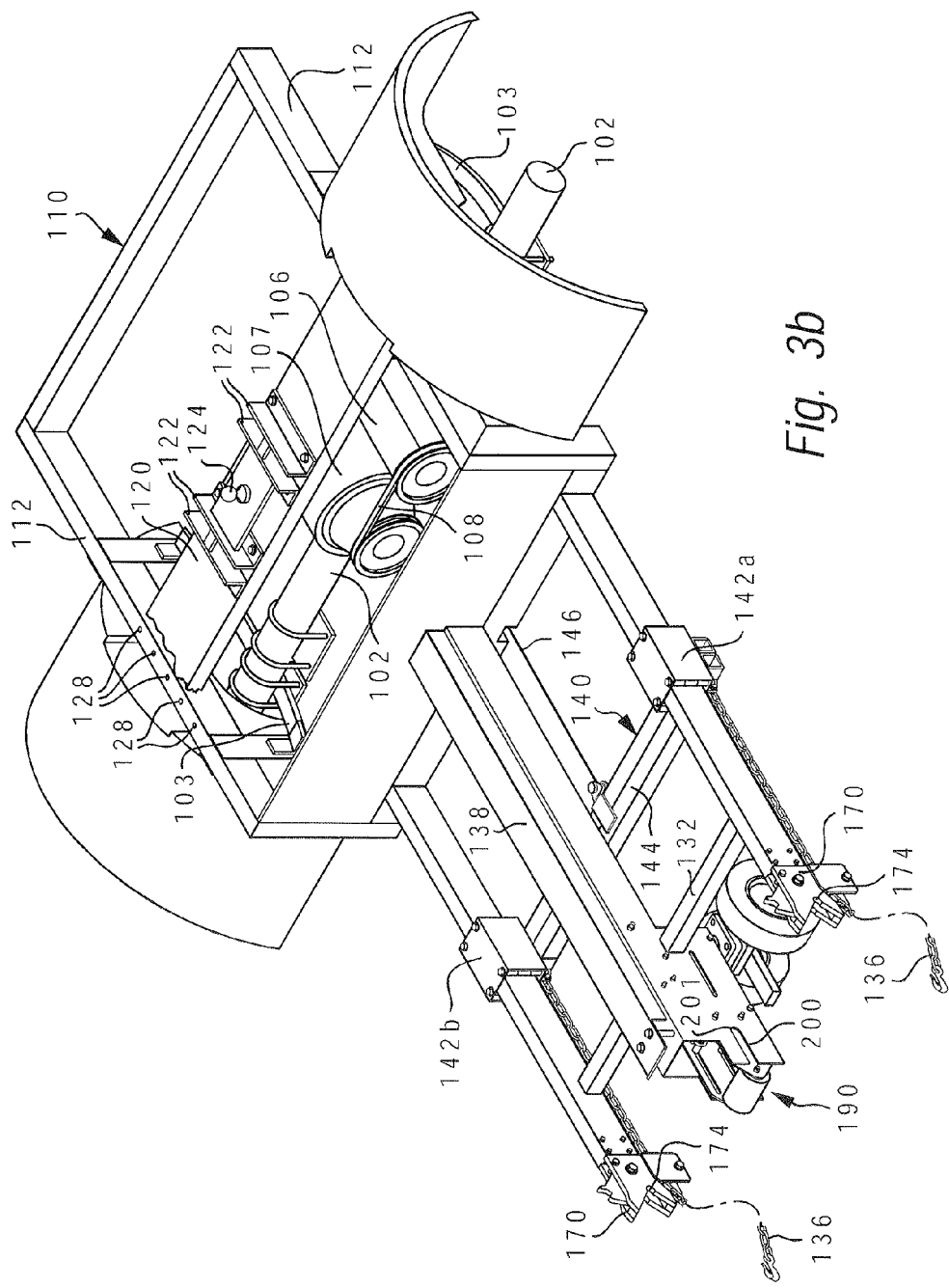
Figure 3C:
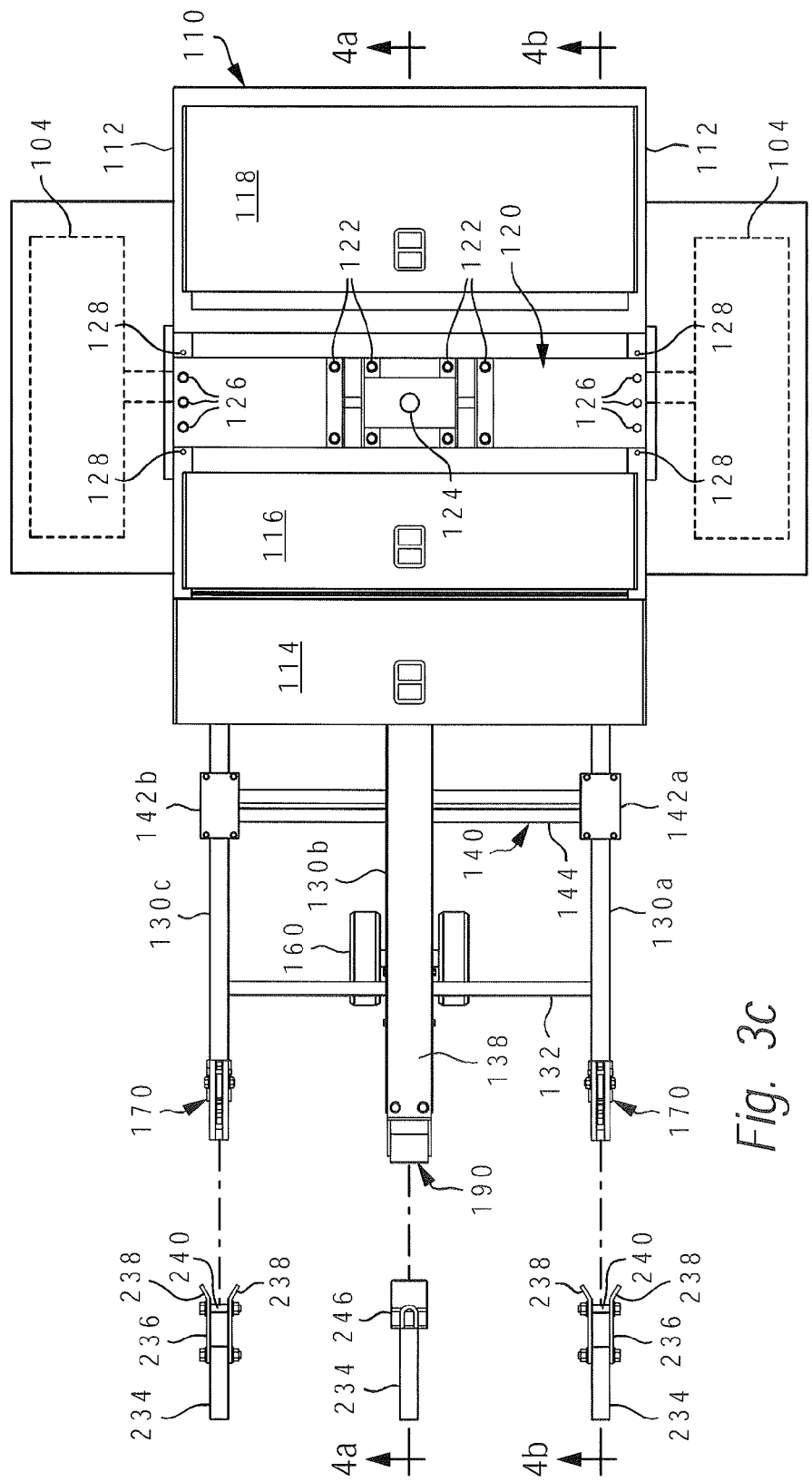

For example, as shown in FIGS. 3a-c the saddle 120 includes on its lateral ends a plurality of attachment bolts 126, which correspond to a plurality of longitudinally spaced, vertical alignment holes 128 formed in each of the longitudinal rails 112 of the framework assembly 110. In the embodiment shown, the saddle 120 includes three attachment bolts 126 on each end which correspond to five alignment holes 128 through each of the longitudinal rails 112 of the framework assembly 110. Thus, the longitudinal position of the saddle 120 relative to the axle assembly 102 may be adjusted depending upon which three alignment holes 128 on the longitudinal rails 112 of the framework assembly 110 are selected. For example, if the three forward-most alignment holes 128 are selected, the saddle 120 will be positioned slightly forward of the axle assembly 102, while if the three rear-most alignment holes 128 are selected, the saddle 120 will be positioned slightly aft of the axle assembly 102. Similarly, if the three center-most alignment holes 128 are selected, the saddle 120 will be positioned directly over of the axle assembly 102.

The main framework assembly 110 mounted over the axle assembly 102 is attached to the towing vehicle via three linkage arms 130a, 130b, 130c attached to and extending from the main framework assembly 110. The three linkage arms 130a, 130b, 130c are fixably attached and integral to main framework assembly 110. In addition, the linkage arms are evenly spaced and substantially parallel to one another. A lateral crossbar 132 may also be attached to the three linkage arms 130a, 130b, 130c to reinforce and stiffen the resulting framework assembly 110.

The distal ends of linkage arms 130a, 130b, 130c each include a latching mechanism designed to selectively engage a hitch assembly 220 attached to the frame of the towing vehicle 222. The latching mechanisms are aligned so as to pivot about a substantially common axis of rotation. For example, in a preferred embodiment, the two outboard linkage arms 130a, 130c each include a gate latch mechanism 170, which pivots about a respective a horizontal bolt 240 on the hitch assembly 220. Likewise, the center linkage arm 130c includes a compression latch mechanism 190, which, when properly aligned and engaged with the hitch assembly 220, pivots about an axis of rotation which is substantially common with that of horizontal bolts 240.

While the preferred embodiment of the accessory towing apparatus 100 depicted in Figures includes gate latch mechanisms 170 on the two outboard linkage arms 130a, 130c and a compression latch mechanism 190 on the center linkage arm 130c, it is understood that, depending upon the particular circumstances, a variety of types of latching mechanisms may be employed. For example, the distal ends of the three linkage arms 130a, 130b, 130c may all include gate latch mechanisms 170, or the center linkage arm 130c could include a gate latch mechanism 170 while compression latch mechanisms 190 is used on the two outboard linkage arms 130a, 130c. Regardless of which type of latching mechanism is selected, common to all latching mechanisms is that, when properly engaged with to the hitch assembly 220 attached to the frame of the towing vehicle 222, they pivot about a substantially common axis of rotation. Moreover, when the three linkage arms 130a, 130b, 130c are properly engaged with to the hitch assembly 220, they are essentially parallel to one another. Thus, it will further be observed that when the three linkage arms 130a, 130b, 130c are so engaged, the axle assembly 102 is aligned substantially parallel with the traction axle of the towing vehicle. The accessory towing apparatus 100 securely maintains the axle assembly 102 in a substantially parallel alignment with the traction axle of the towing vehicle during all dynamic operations further enhancing the stability and control of the towing assembly.

Figure 5A:
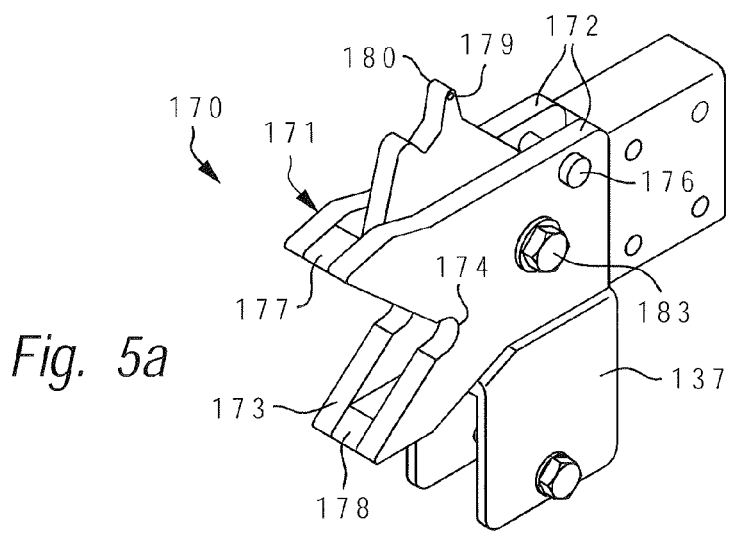
FIG. 5a is a perspective view of a latching mechanism of the accessory towing apparatus of the present invention.
Figure 5B:
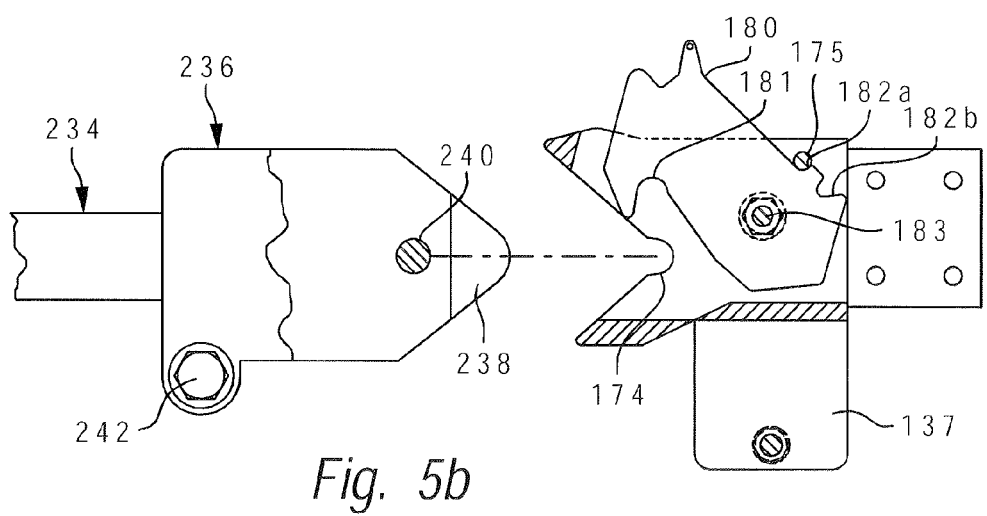
FIG. 5b is a side view of the latching mechanism shown in FIG. 5a depicting the mechanism in an opened position.
Figure 5C:
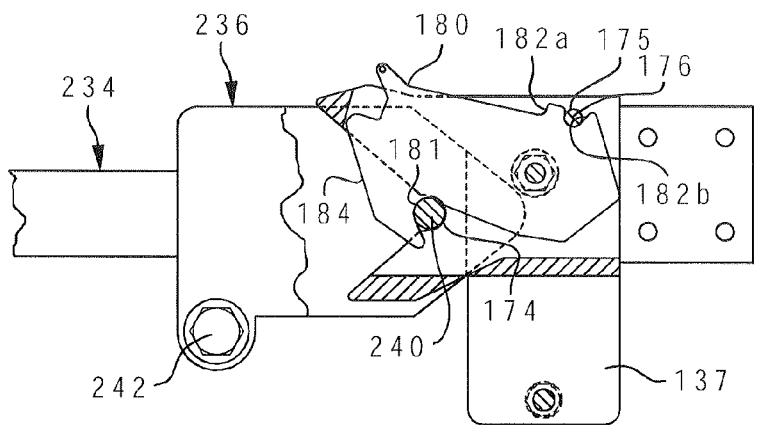
FIG. 5c is a side view of the latching mechanism shown in FIG. 5a depicting the mechanism in a closed position while engaged with the horizontal gate rod assembly of a receiver bracket of the vehicle receiver hitch of the present invention.

With reference to FIGS. 5a-5c, close up views of a preferred embodiment of the gate latch mechanism 170 and gate receiver bracket 236 are depicted. The gate latch mechanism 170 is operable to engage the gate receiver bracket 236 attached to the vehicle receiver hitch 220. The gate latch mechanism 170 comprises a latch bracket or housing 171 comprised of two opposing plates 172 having a latch assembly 180 positioned therebetween. The latch assembly 180 is pivotally attached to the two opposing plates 172 by means of a bolt 183. The latch housing 171 also includes a V-shaped jaw 173 formed in the plates 172 and a part-cylindrical recess or seat 174 for receiving the horizontal gate rod assembly 240 of the gate receiver bracket 236 of the hitch assembly 220. The two opposing plates 172 are joined at the upper 177 and lower 178 portions of the V-shaped bracket jaw 173. The two opposing plates 172 further include opposing co-incident holes 175 for receiving a locking pin 176. The latch assembly 180 includes a curved recess surface or seat 181 for capturing the horizontal gate rod assembly 240 against the seat 174 of the latch housing 171 when the latch assembly 180 is pivoted about the pivot bolt 183. The latch assembly 180 also includes a notch 182 for securing the position of the latch assembly 180 within the latch housing 171 by means of the locking pin 176.

In FIG. 5b, the gate latch mechanism 170 is depicted as locked in an opened position in preparation for engaging the gate receiver bracket 236 of the hitch assembly 220. The latch assembly 180 has been pivoted about bolt 183 so as to clear the V-shaped jaw 173 and seat 174 formed in the plates 172. The locking pin 176 inserted through holes 175 impinges on a notch 182a thereby securing the position of the latch assembly 180 within the latch housing 171.

The gate receiver bracket 236 includes a housing comprised of two parallel-spaced opposing plates 237 having a horizontal gate rod assembly 240 disposed there between. The receiver bracket 236 is fixably attached to a mounting tongue 234. The lateral spacing between the plates 237 is sufficient to snugly accept the latch housing 171 the gate latch mechanism 170 with minimal lateral movement. As shown particularly in FIG. 3c, the two plates 237 are splayed opened at the open end of the receiver bracket 236 in front of the gate rod assembly 240. This splayed end portion 238 assists the gate latching mechanism 170 to more smoothly align and engage the gate receiver bracket 236. The gate receiver bracket 236 may further include an alignment rod 242 disposed between the two opposing plates 237 and incorporated into the lower rear portion of the bracket 236. As will be subsequently explained in greater detail, the alignment rod 242 is positioned to accept an alignment chain from the accessory towing apparatus 100.

In FIG. 5c, the gate latch mechanism 170 is depicted in a closed position while engaged with the gate receiver bracket 236 of the hitch assembly 220. Upon removal of the locking pin 176 from holes 175, the latch assembly 180 pivots about bolt 183 so as capture the horizontal gate rod 240 of gate receiver bracket 236 between the curved recess surface 181 of the latch assembly 180 and the curved seat 174 of the latch housing 171. The locking pin 176 can then be re-inserted through holes 175 so as to impinge upon a second notch 182b thereby securing the latch assembly 180 within the latch housing 171. The latch assembly 180 is typically balanced around bolt 183 so as to be biased in a closed position. It will be observed that the front face portion 184 of the latch assembly 180 is angled so that when the locking pin 176 is removed, the latch assembly 180 will automatically open and close around the horizontal gate rod 240 when the gate latch mechanism 170 and gate receiver bracket 236 are drawn together. In addition, the latch assembly 180 may further include an aperture 179 through which an attached strap (not shown) may assist in actuating the latch assembly 180 within the latch housing 171.

With reference now to FIGS. 4a, and 6a-b, an embodiment of the compression latch mechanism 190 is depicted. In its most basic form, the mechanism 190 comprises a roller bearing 191 pivotally attached to a U-shaped roller sleeve 194, which is captured in a sleeve housing 198 incorporated into the distal end of a linkage arm. The roller bearing 191 is pivotally attached to the roller sleeve 194, by means of a center pin bolt 192. The roller sleeve 194 is slidably coupled with the sleeve housing 198 along its longitudinal axis. The two side walls of the roller sleeve 194 include slots 196, which ride on stationary bolts 206 that are fixably attached to the sleeve housing 198. The slots 196 and bolts 206 prevent the roller sleeve 194 from cocking in the sleeve housing 198 and assist the roller sleeve 194 in translating smoothly within the housing 198. The mechanism 190 further comprises a biasing mechanism 204, which is attached between a stationary bolt 206 and a rear wall 194a of the roller sleeve 194. For example, in the embodiment depicted in the Figures, the biasing mechanism comprises a plurality of tension spring mechanisms, which are each attached between the stationary bolt 206 and a separate eye-bolt 195 attached to the rear wall 194a of the roller sleeve 194. The biasing mechanism is designed so that its bias force increases as the roller sleeve 194 is compressed or pushed into the sleeve housing 198.

The sleeve housing 198 may also include an alignment slot 200 which limits the extent to which the roller sleeve 194 is compressed into the sleeve housing 198. The alignment slot 200 acts as a channel for the ends of the center pin bolt 192 which extends laterally away from the roller sleeve 194. The alignment slot 200 is designed so that the roller sleeve 194 may be compressed into the sleeve housing 198 until the center pin bolt 192 comes into contact with the rear wall 201 of the alignment slot 200. With reference to the embodiment shown in the Figures and particularly FIG. 3d, it will be observed that the rear wall 201 of the alignment slot 200 is co-aligned with the curved seat 174 of the gate latch mechanisms 170.

The compression latch mechanism 190 is operable to engage a ramp receiver bracket 246 attached to the hitch assembly 220. With reference again to the Figures, and in particular FIGS. 3c and 4a, the compression latch mechanism 190 is designed to engage a notch 247 formed in ramp bracket 246 as the accessory towing apparatus 100 is drawn toward the hitch assembly 200. It will be noted that the ramp receiver bracket 246 includes a lower wing 248 extending below and away from the notch 247 and an upper wing 249 extending above and away from the notch 247. These wings assist in engaging and channeling the compression latch mechanism 190 into the notch 247 of the ramp receiver bracket 246 as the accessory towing apparatus 100 is drawn toward the hitch assembly 200 on an uneven surface.

Thus, as the accessory towing apparatus 100 is drawn closer to the hitch assembly 200, the roller bearing 191 of the compression latch mechanism 190 engages a portion of the ramp receiver bracket 246 compressing the roller sleeve 194 into the sleeve housing 198 until the center pin bolt 192 impinges on the rear wall 201 of the alignment slot 200. At this point, roller bearing 191 is fully seated in the notch 247 and the ramp receiver bracket 246 is captured laterally between the walls of the sleeve housing 198.

With reference again to FIGS. 3c and 3d, it will be noted that when the accessory towing apparatus 100 is not engaged with a towing vehicle, the compression latch mechanism 190 on the distal end of the center linkage arm 130b extends past the gate latch mechanisms 170 of the two outboard linkage arms 130a, 130c. This permits the compression latch mechanism 190 to interact with its respective ramp receiver bracket 246 prior to the gate latch mechanisms 170 engaging their respective gate receiver bracket 236. Thus, as the compression latch mechanism 190 is channeled towards the notch 247 of the of the ramp receiver bracket 246, the latch mechanisms 170 of the two outboard linkage arms 130a, 130c are correspondingly aligned with their respective gate receiver bracket 236 prior to each latch mechanism engaging its respective gate receiver bracket 236.

The accessory towing apparatus 100 may also include a jockey wheel 160 positioned on one or more of the linkage arms 130a, 130b, 130c for increased stability when the accessory towing apparatus 100 is detached from the towing vehicle. The arm 164 connecting the jockey wheel 160 to the accessory towing apparatus 100 may of a fixed or adjustable length. The jockey wheel arm 164 may further comprise a screw jack mechanism (not shown) for retracting the jockey wheel 160 when the accessory towing apparatus 100 is attached and secured to a towing vehicle. The jockey wheel arm 164 may also be demountably attached to the accessory towing apparatus 100 so as to be removable when the accessory towing apparatus 100 is attached and secured to a towing vehicle. The jockey wheel arm 164 may also be pivotally attached to a linkage arms 130 so as to pivotally retract when the accessory towing apparatus 100 is attached and secured to a towing vehicle.

Figure 3D:
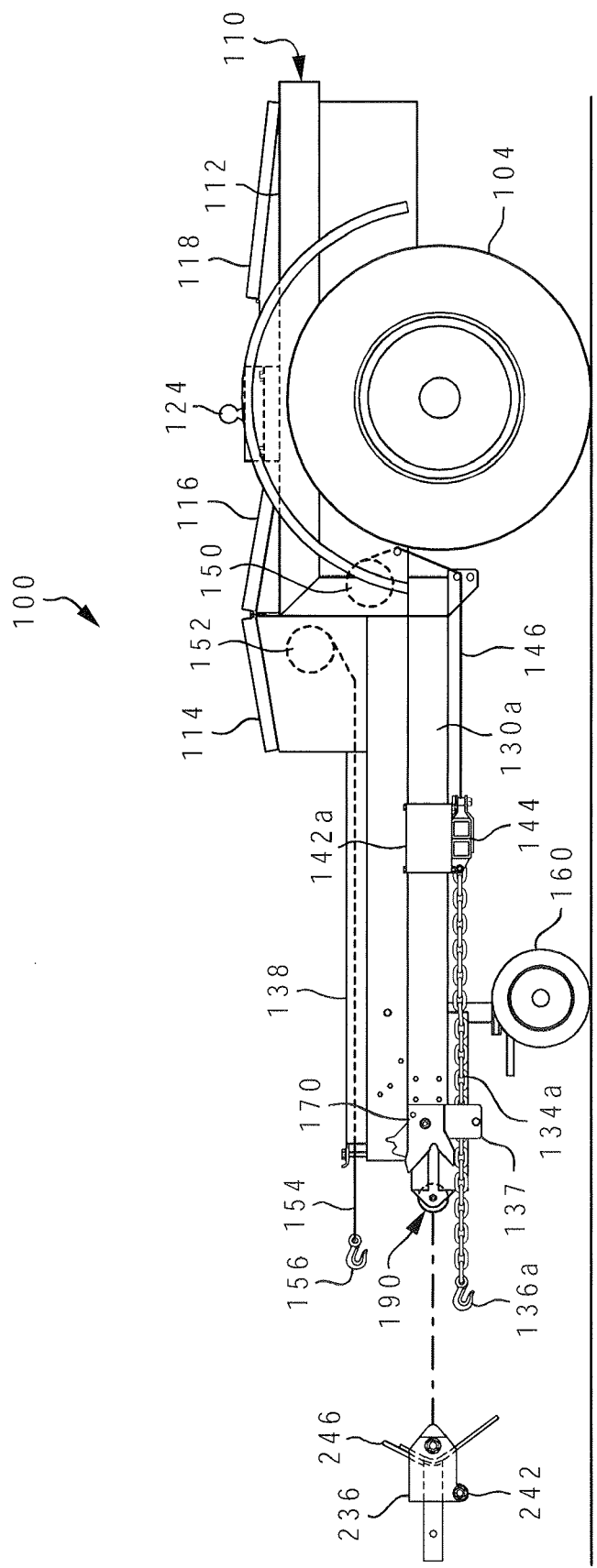

As shown in FIG. 3*d*, the accessory towing apparatus 100 may further include a tunnel 138 positioned along the topside of a linkage arm 130*c*, through which a hook 156 and accessory retrieval cable 154 are connected to an accessory retrieval winch 152 which provides a self recovery capability to the accessory towing apparatus 100. The accessory retrieval winch 152 is preferably self-contained and integral to the accessory towing apparatus 100 and may be powered and controlled mechanically, electrically, hydraulically or any combination thereof. For example, as depicted in FIG. 3*d*, the accessory retrieval winch 152 may be located in the forward cargo box 114. The retrieval cable 154 is of sufficient length (e.g., 80 to 100 feet) to enable the accessory towing apparatus 100 to recover itself and an attached trailer a considerable distance. Thus, for example, if an accessory towing apparatus 100 and attached trailer are located in a muddy or sandy area, the accessory retrieval winch 152 and cable 154 allow the accessory towing apparatus 100 to extract itself to a more suitable area without involving or jeopardizing the towing vehicle.

Figure 7:
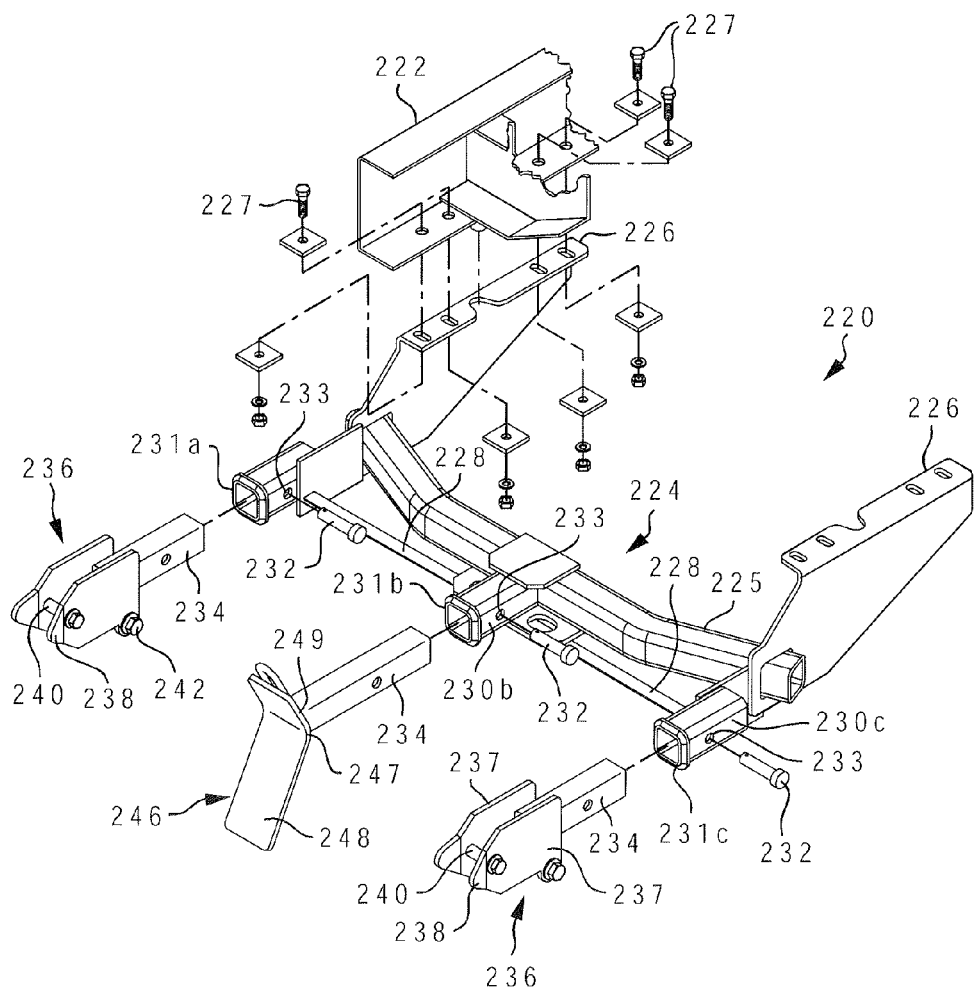
FIG. 7 is perspective views of the novel receiver hitch mechanism used in conjunction with the accessory towing apparatus of the present invention.

With reference now to FIG. 7, an embodiment of the novel receiver hitch mechanism 220 used in conjunction with the accessory towing apparatus 100 of the present invention is shown. The receiver hitch mechanism 220 includes a receiver hitch framework 224 having three receiver sockets or boxes and comprised of a robust lateral cross member 225 attached and suspended between two attachment wings 226. The two attachment wings 226 are designed to be mounted to the frame 222 of the towing vehicle. As depicted in FIG. 7, the two attachment wings 226 are operable for attachment to the main frame structure 222 of the towing vehicle. In actual practice the attachment wings 226 may be attached through welding or common fastener means such as nuts and bolts 227 as shown, or may be integral to the main frame structure 222 of the towing vehicle.

The three receiver sockets or boxes 230*a*, 230*b*, 230*c* are attached to the lateral cross member 225 of the receiver hitch framework 224 and are generally evenly spaced to one another. The receiver hitch framework 224 may further include lateral reinforcement members 228 between the three receiver boxes 230*a*, 230*b*, 230*c*. The receiver hitch framework 224 is designed so that, when attached to a towing vehicle, one receiver box 230*b* is generally centered on the rear of the towing vehicle and the two outboard receiver boxes 230*a*, 230*c* are generally aligned longitudinally with the main frame structure 222 of the towing vehicle. As shown in the embodiment depicted in FIG. 7, the three receiver boxes 230*a*, 230*b*, 230*c* are similarly sized and extend equidistantly away from the rear of the towing vehicle aligned. Moreover, the openings 231*a*, 231*b*, 231*c* of the three receiver boxes or sockets are typically aligned along a common horizontal axis and vertical plane. While the alignment of the three receiver boxes 230*a*, 230*b*, 230*c* relative to one another may be varied depending upon the circumstances, it is understood that the means for attaching the receiver brackets to the receiver boxes will have to be correspondingly varied so that the latching mechanisms are co-aligned so as to pivot about a substantially common axis of rotation.

The three receiver sockets 230*a*, 230*b*, 230*c* are each operable for receiving a receiver bracket mounting tongue 234 and attached receiver bracket 136, 246. Each mounting tongue 234 is selectively secured in its respective receiver socket by means of a securing pin 232 inserted though co-aligned holes 233, 235 in the respective receiver box 230 and mounting tongue 234. When not in use, the receiver bracket assemblies (i.e., mounting tongue 234 and respective attached receiver bracket 136, 246) may be removed from the receiver boxes for safekeeping.

Automatic-Aligning and Docking System

With reference to the Figures and in particular FIGS. 3*d* and 8, a preferred embodiment of the accessory towing apparatus 100 is shown that includes an automatic alignment and docking system. The automatic alignment system includes an alignment yoke mechanism 140, which connects an alignment/docking winch 150 with two alignment chains 134*a*, 134*b*, which are selectively attached to the vehicle receiver hitch 220 of a tow vehicle. The two alignment chains 134*a*, 134*b* are of substantially equal length and adequately spaced apart, such that when the chains are attached to a tow vehicle the centerline of the trailer may be aligned with the centerline of the tow vehicle by simply driving the tow vehicle straight forward a short distance. The alignment/docking winch 150 is preferably self-contained and integral to the accessory towing apparatus 100 and may be powered and controlled mechanically, electrically, hydraulically or any combination thereof. For example, as shown in the embodiment depicted in FIG. 3*d*, the alignment/docking winch 150 is located in the middle cargo box 116.

The alignment yoke mechanism 140 further comprises a yoke crossbar member 144 suspended between two yoke sleeves 142. The left yoke sleeve 142*a* is slidably coupled with the left outboard linkage arm 130*a* while the right yoke sleeve 142*b* is slidably coupled with the right outboard linkage arm 130*c*. The yoke crossbar member 144 maintains the two yoke sleeves 142*a*, 142*b* in a substantially parallel alignment with one another. While the yoke crossbar member 144 depicted in the Figures is substantially straight, it is understood that the yoke crossbar member 144 could be of any geometry so long as the two yoke sleeves 142*a*, 142*b* are maintained in a parallel alignment to one another. For example, the yoke crossbar member 144 could be circular and or angular across its lateral extent. A cable 146 attached to the lateral center of to the yoke crossbar member 144 connects the alignment yoke mechanism 140 with the alignment/docking winch 150. Thus, subject to the length of cable 146 deployed from the alignment/docking winch 150, the alignment yoke mechanism 140 is free to translate longitudinally along a large extent of the length of the linkage arms.

As depicted in FIG. 3*a*, in a preferred embodiment the two alignment chains 134*a*, 134*b* are attached to opposing ends of the alignment yoke mechanism 140. The two alignment chains 134*a*, 134*b* are aligned with the two outboard linkage arms 130*a*, 130*c*. For example, as depicted in FIG. 3*a*, one alignment chain 134*a* attached to the alignment yoke mechanism 140 is aligned along the underside of the left outboard linkage arm 130*a*, while another alignment chain 134*b* attached to the alignment yoke mechanism 140 is aligned along the underside of the left outboard linkage arm 130*c*. Chain retention brackets 137 located on the underside of each latching mechanism 170 further assist in maintaining the alignment of the alignment chain 134*b* along the length of its respective linkage arm. Moreover, by impinging on their respective alignment chains as the accessory towing apparatus 100 is drawn towards the towing vehicle, the chain retention brackets 137 also help to steer the accessory towing apparatus 100 into a proper alignment behind the towing vehicle.

The distal or loose ends of each of the two alignment chains 134*a*, 134*b* include a mechanism 136 for grasping the vehicle receiver hitch 220. For example, in the embodiment depicted in the Figures, the grasping mechanism 136 comprises a hook which may be attached to an alignment rod 242 incorporated into the lower portion of a gate receiver bracket 236 attached to the vehicle receiver hitch 220.

It is understood that the terms "chain" and "cable" as used in reference to alignment chains 134a, 134b, yoke cable 146, and/or accessory retrieval cable 154 are used for purposes of identification and not a specific limitation. Therefore, any suitably strong chain, cable, wire or lanyard would come within the meaning of the term "chain" or "cable" as used with the specification. Moreover, with regard to specific embodiments, the terms "chain" and "cable" may be used interchangeably. Thus, the alignment chains 134a, 134b, yoke cable 146, and/or accessory retrieval cable 154 may in actuality be either chains or cables depending on the specific circumstances.

In an alternate embodiment, a worm screw mechanism contained within a linkage arm (not shown) is used instead of the yoke cable 146 to connect the yoke mechanism 140 to the alignment/docking winch 150. A single worm screw mechanism may be attached to the center of the yoke crossbar member 144 or separate worm screw mechanisms may be attached to the two yoke sleeves 142.

The automatic alignment system of the subject invention is utilized by positioning the vehicle receiver hitch 220 of a tow vehicle a short distance away from and roughly centered on the front of the accessory towing apparatus 100, so that the receiver brackets of the vehicle receiver hitch 220 are roughly aligned with their respective latch assemblies. The alignment/docking winch 150 is energized so that cable 146 is spooled out allowing the alignment yoke mechanism 140 to freely translate along the length of the outboard linkage arms 130a, 130c, thereby allowing the alignment chains 134a, 134b to be extended past the distal ends of the outboard linkage arms 130a, 130c.

As perhaps shown best in FIG. 3d, in theory the alignment chains 134a, 134b can be extended past the distal ends of the outboard linkage arms 130a, 130c approximately the same distance as the length of the outboard linkage arms 130a, 130c. If a greater distance exists between the towing vehicle and the accessory towing apparatus 100, the accessory retrieval winch 152 and cable 154 described earlier may be utilized bring the towing vehicle and the accessory towing apparatus 100 within the initial engagement limits of the automatic alignment system.

For example, if the accessory towing apparatus 100 and attached trailer are positioned in a soggy area having poor traction, the towing vehicle can be positioned on solid footing. The accessory retrieval winch 152 and cable 154 would first be utilized draw the accessory towing apparatus 100 to within the initial engagement limits of the automatic alignment system.

When the vehicle receiver hitch 220 is positioned sufficiently close to the accessory towing apparatus 100, the loose ends of the two alignment chains 134a, 134b are attached to the vehicle receiver hitch 220 in preparation for aligning and docking the accessory towing apparatus 100 to the tow vehicle. As shown in FIG. 8, in a preferred embodiment, the two alignment chains 134a, 134b are each attached to an alignment rod 242 incorporated into the lower portion of the respective gate receiver bracket 236 attached to the vehicle receiver hitch 220. The centerline of the accessory towing apparatus 100 and attached trailer is then aligned with the centerline of the tow vehicle by simply driving the tow vehicle straight forward a short distance.

Upon aligning the centerlines, the tow vehicle is halted in place. The alignment/docking winch 150 is then energized to reel in the yoke cable 146 and draw the alignment yoke mechanism 140 towards the rear of the accessory towing apparatus 100. The accessory towing apparatus 100 is correspondingly drawn toward the vehicle receiver hitch 220 in response to the movement of the yoke mechanism 140. Thus, the alignment of each latching mechanism with its respective complementary receiver bracket is maintained as the accessory towing apparatus 100 is drawn toward the vehicle receiver hitch 220. Upon securing the latching mechanisms in their respective receiver bracket, the yoke cable 146 and corresponding alignment chains 134a, 134b may be slackened somewhat so as to act as trailer safety chains.

Figure 9A:
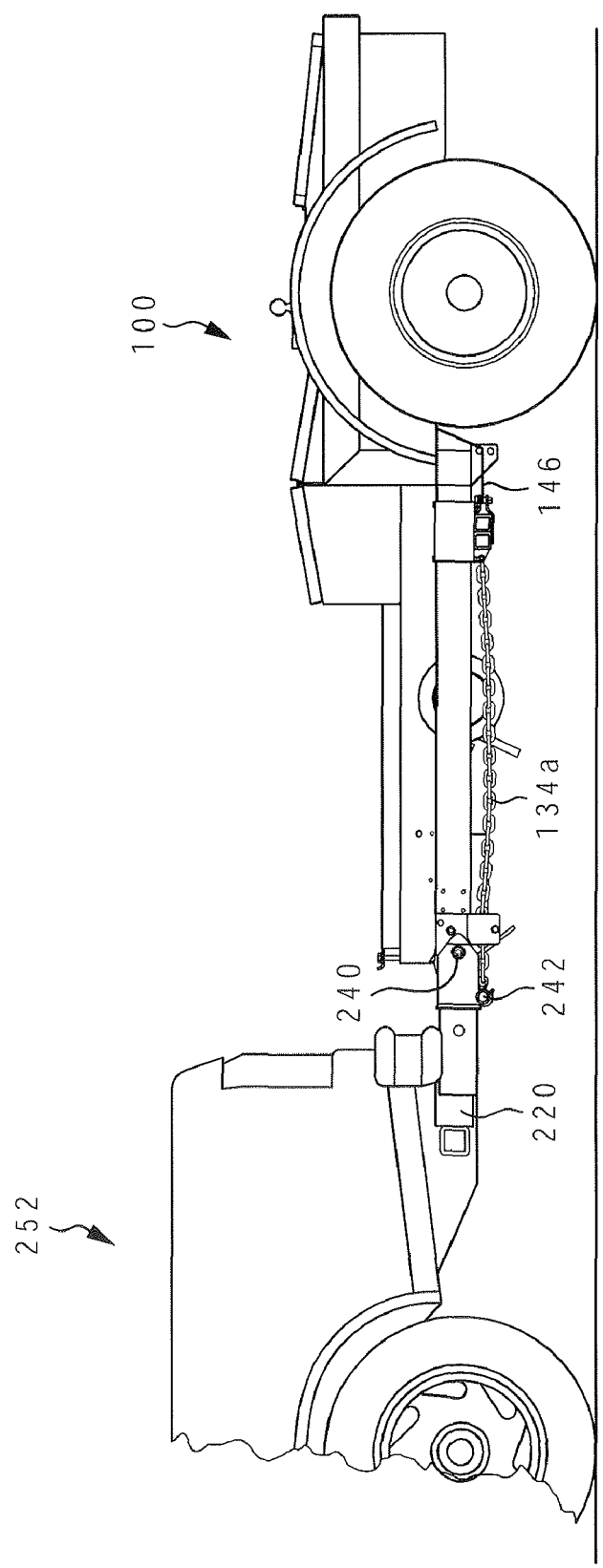
FIGS. 9a-9b are side views of the accessory towing apparatus of the present invention locked and engaged with the towing vehicle.
Figure 9B:
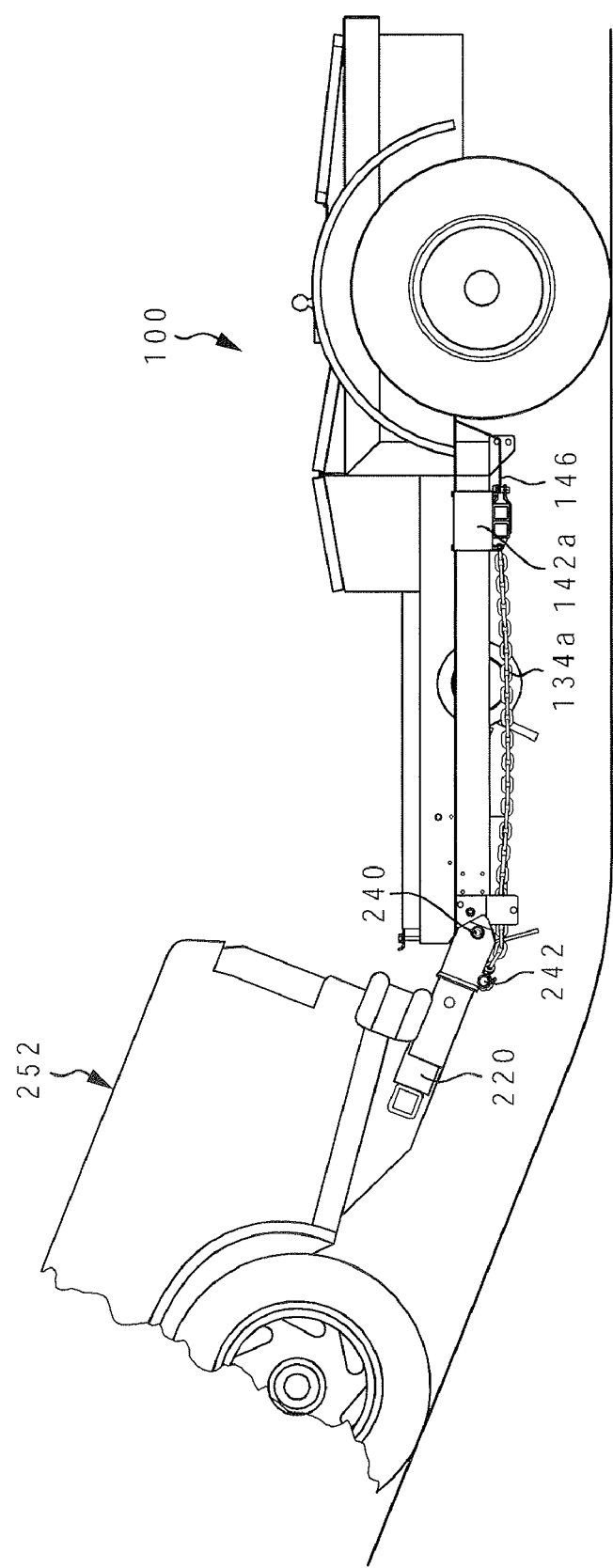

As noted previously, when the latching mechanisms are properly engaged with corresponding receiver brackets on the hitch assembly 220, the latching mechanisms pivot about a substantially common axis of rotation. For example, with reference to FIGS. 9a-b, the embodiment of the accessory towing apparatus 100 previously depicted in FIGS. 3a-d is shown having been properly engaged to the hitch assembly 220 attached the towing vehicle 252. Upon securing the respective latch mechanisms into their corresponding receiver brackets, all three linkage arms 130a, 130a, 130c freely pivot about a substantially common axis of rotation. The substantially common axis of rotation is defined by a longitudinal axis extending through the horizontal gate rod assembly 240 of the gate receiver brackets 236 and the center pin 191 of the compression latch mechanism 190. Thus, as depicted in FIG. 9b, when the towing vehicle 252 and attached towing apparatus 100 proceed up an incline, the ends of the three linkage arms 130a, 130a, 130c freely pivot about a substantially common axis of rotation, and correspondingly maintain the alignment of the accessory towing apparatus 100 with the towing vehicle 252.

Figure 10:
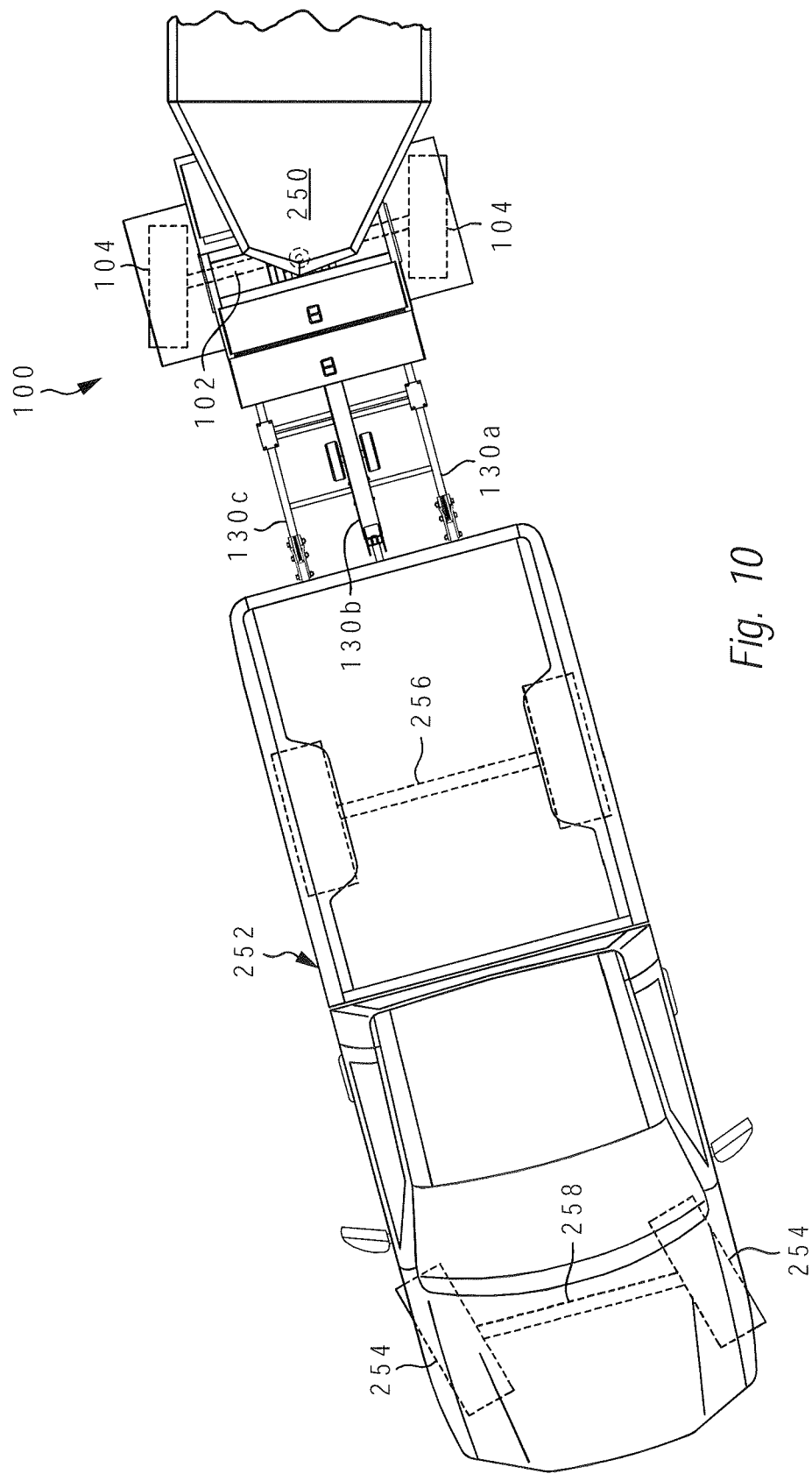
FIG. 10 is an overhead view of the accessory towing apparatus of the present invention locked and engaged with the towing vehicle.

Moreover, as shown in FIG. 10, when the three linkage arms 130a, 130b, 130c are properly engaged with to the hitch assembly 220, they are essentially parallel to one another. It will further be observed that when the three linkage arms 130a, 130b, 130c are so engaged, the axle assembly 102 of the accessory towing apparatus 100 is aligned substantially parallel with the axles 256, 258 of the towing vehicle 252. The accessory towing apparatus 100 securely maintains the axle assembly 102 in a substantially parallel alignment with the axles 256, 258 of the towing vehicle 252 during all dynamic operations further enhancing the stability and control of the towing assembly.

In particular, when the axle assembly 102 of the accessory towing apparatus 100 comprises a steerable axle assembly, described previously, the accessory towing apparatus 100 is able to coordinate its turns in relation to the towing vehicle. Thus, as depicted in FIG. 10, when the towing vehicle 252 initiates a turn to the left by turning its front wheels 254 to the left, as it pulls forward the accessory towing apparatus 100 induce its wheels 104 to turn in an opposite direction relative to the accessory towing apparatus 100 to coordinate the turn. By maintaining its axle assembly 102 in a substantially parallel alignment with the axles 256, 258 of the towing vehicle 252, the accessory towing apparatus 100 causes the wheels 104 to pivot or turn in an opposite direction relative to the accessory towing apparatus 100. As a consequence, the handling characteristics and maneuverability of the combined towing vehicle 252, accessory towing apparatus 100, and attached gooseneck-type trailer 250 is greatly improved.

Automatic Wheel Retraction/Extension System

Another innovative aspect of the present invention comprises a wheel retraction/extension system used in conjunction with the compression latch mechanism to automatically raise and lower the jockey wheel assembly. The automatic wheel retraction/extension system mechanically links the compression latch mechanism 190, described previously, with a jockey wheel assembly pivotally attached to a linkage arm of the accessory towing apparatus 100. For example, as shown in the Figures, in a preferred embodiment of the subject invention the automatic wheel retraction/extension system is integrated into a compression latch mechanism 190 that is incorporated within the center linkage arm 130b.

With reference to the Figures, and in particular FIGS. 4a, 6a-b, and 11a-d, a preferred embodiment of the automatic wheel retraction/extension system is depicted. The system is comprised of a jockey wheel assembly that is mechanically linked with a compression latch mechanism 190. The jockey wheel assembly is comprised of a jockey wheel 160 and connecting arm 164, which is pivotally attached to the linkage arm 130b. The alignment of the jockey wheel 160 relative to the connection arm 164 may be fixed or variable. For example, the jockey wheel assembly may further comprise a caster mechanism 163 which permits the jockey wheel 160 to freely swivel about the longitudinal axis of the connection arm 164. Such swivel-mounted jockey wheel assemblies may further comprise a counter-weight auto center mechanism 162 to bias the alignment of the jockey wheel assembly as it is retracted. The counter-weight auto center mechanism 162 is typically positioned below the caster mechanism 163 so as to bias the alignment of the jockey wheel 160 relative to the connection arm 164 and correspondingly the linkage arm.

The arm 164 connecting the jockey wheel 160 to the accessory towing apparatus 100 may of a fixed or adjustable length. For example, as shown in the Figures, the connection arm 164 may include a fixed member 165, which is pivotally attached to the linkage arm, and an adjustable sleeve member 166, which is slidably coupled to the fixed member 165. The length of connection arm 164 is changed adjusted by changing the position of the adjustable sleeve member 166 relative to the fixed member 165.

The compression latch mechanism 190 of the automatic wheel retraction/extension system is essentially the same as described previously, with the addition of a cam and downlock assembly that mechanically links the compression latch mechanism 190 and the jockey wheel assembly. The compression latch mechanism 190 comprises a roller bearing 191 pivotally attached to a U-shaped roller sleeve 194, which is captured in a sleeve housing 198 incorporated into the distal end of the linkage arm 130b. The roller bearing 191 is pivotally attached to the roller sleeve 194, by means of a center pin bolt 192. The roller sleeve 194 is slidably coupled with the sleeve housing 198 along its longitudinal axis. The two side walls of the roller sleeve 194 include slots 196, which ride on stationary bolts 206 that are fixably attached to the sleeve housing 198. The slots 196 and bolts 206 prevent the roller sleeve 194 from cocking in the sleeve housing 198 and assist the roller sleeve 194 in translating smoothly within the housing 198. The mechanism 190 further comprises a biasing mechanism 204, which is attached to a stationary bolt 206 and a rear wall 194a of the roller sleeve 194. For example, in the embodiment depicted in the Figures, the biasing mechanism comprises a plurality of tension spring mechanisms. The biasing mechanism is designed so that its bias force increases as the roller sleeve 194 is compressed or pushed into the sleeve housing 198.

The sleeve housing 198 may also include an alignment slot 200 which limits the extent to which the roller sleeve 194 is compressed into the sleeve housing 198. The alignment slot 200 acts as a channel for a portion of the center pin bolt 192 which extends laterally away from the roller sleeve 194. The alignment slot 200 is designed so that the roller sleeve 194 may be compressed into the sleeve housing 198 until the center pin bolt 192 impinges on the rear wall 201 of the alignment slot 200.

The compression latch mechanism 190 of the automatic wheel retraction/extension system further includes a cam mechanism 214, which is pivotally attached to the U-shaped roller sleeve 194 and mechanically linked with a pin 168 affixed to the connection arm 164 of the jockey wheel assembly. As shown in Figures, in a preferred embodiment, the compression latch mechanism 190 of the automatic wheel retraction/extension system includes two cam mechanisms 214, each of which are pivotally attached to the roller sleeve 194 and mechanically linked with a follower pin 168 affixed to and extending laterally from the connection arm 164 of the jockey wheel assembly. The cam mechanism 214 is pivotally attached to the roller sleeve 194 by means of a pivot bolt 218 extending laterally therethrough. The follower pin 168 is captured in a slot 216 formed in the cam mechanism 214. As the roller sleeve 194 of the compression latch mechanism 190 is pushed back into the sleeve housing 198, the cam mechanisms 214 eventually apply a force on the follower pin 168 that causes the arm 164 of the jockey wheel assembly to retract by rotating about a pivot point 167 that pivotally attaches the jockey wheel assembly to the linkage arm of the accessory towing apparatus 100.

The automatic wheel retraction/extension system may further comprise a downlock mechanism 208 which prevents the jockey wheel assembly from retracting prematurely. As shown in the Figures, in one embodiment the downlock mechanism 208 is pivotally attached to the sleeve housing 198 and positioned just above the roller sleeve 194 of the compression latch mechanism 190. The downlock mechanism 208 includes a downlock detent 211 and notch 213 to one side of the pivotal attachment point 210 and a biasing mechanism 212 on the other side. The biasing mechanism 212 biases the rotation of the downlock mechanism 208 about its pivotal attachment point 210. In the embodiment shown in the Figures, the biasing mechanism 212 comprises a tension spring mechanism.

With reference now to the Figures and in particular to FIGS. 11a-d, the operational sequence of the automatic wheel retraction system will be demonstrated. As previously noted, the compression latch mechanism 190 is designed to engage a ramp receiver bracket 246 attached to the hitch assembly 220. The compression latch mechanism 190 is designed to engage a notch 247 formed in ramp bracket 246 as the accessory towing apparatus 100 is drawn toward the hitch assembly 200.

Figure 11A:
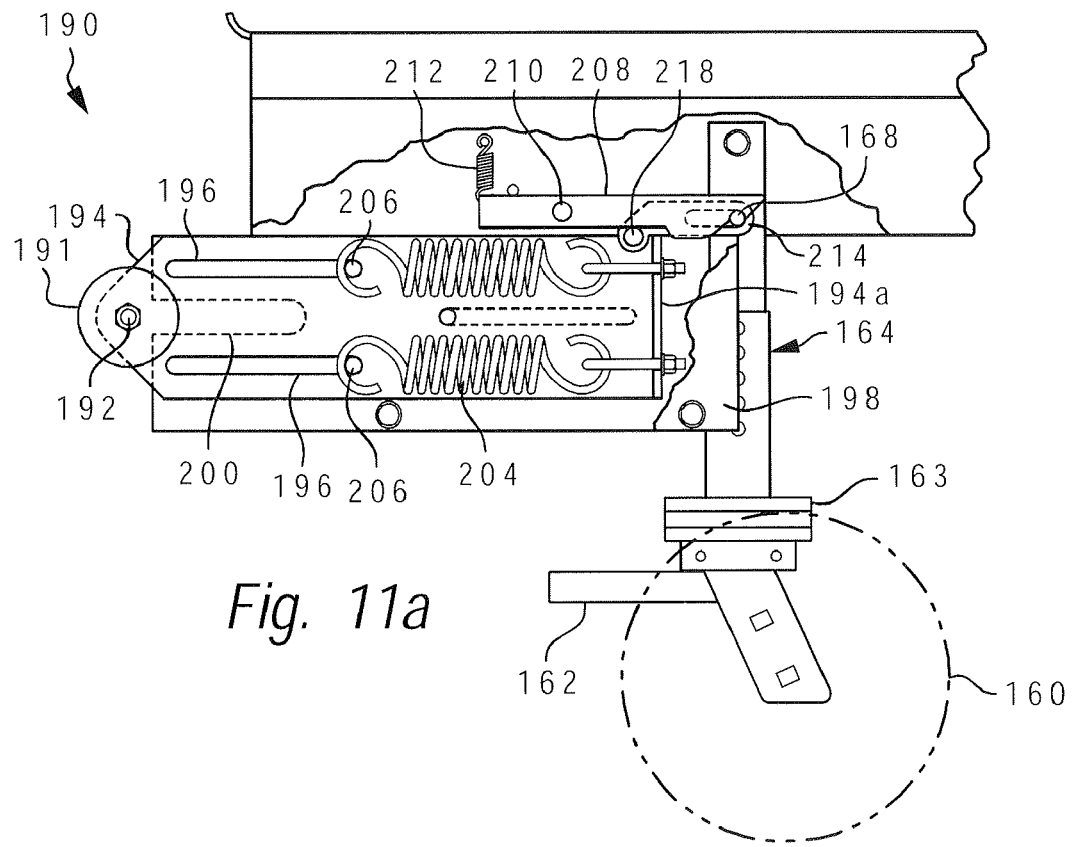
FIGS. 11a-11d are sequenced, cut-away side views of the compression latch mechanism being utilized in conjunction with the automatic wheel retraction system of the accessory towing apparatus of the present invention.
Figure 11B:
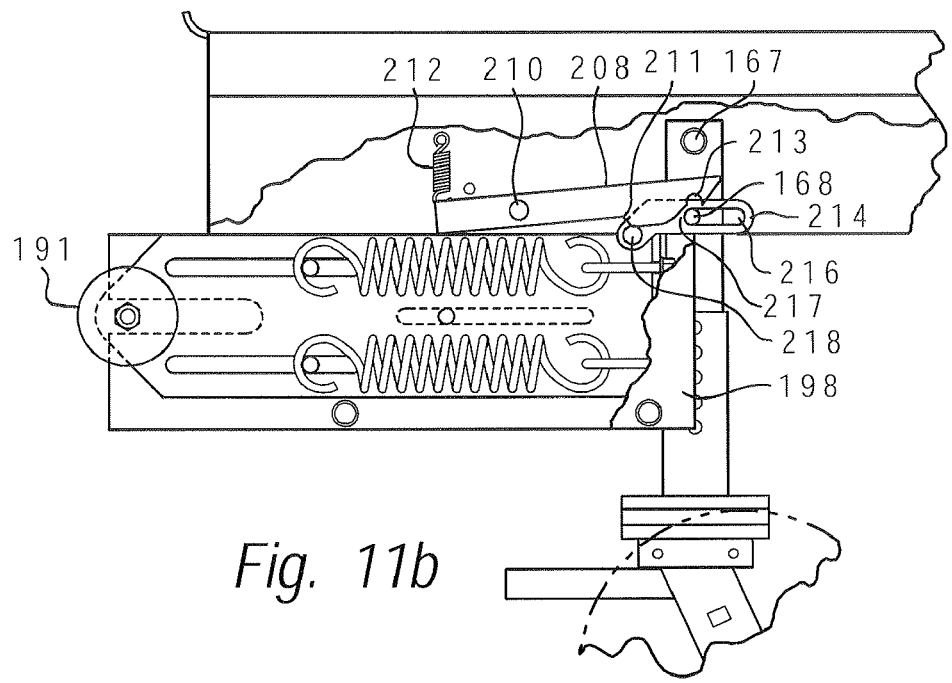

In FIG. 11a, the jockey wheel assembly of the automatic wheel retraction system is shown in a default or down-and-locked position. The roller sleeve 194 of the compression latch mechanism 190 is fully extended from the sleeve housing 198 and there is minimal tension in biasing mechanism 204. The arm 164 of the jockey wheel assembly is fully extended and locked in place by means of the downlock mechanism 208. A notch 213 in the downlock mechanism 208 locks the follower pin 168 of the jockey wheel arm 164 in place, thereby preventing the pin 168 from rotating about the pivot point 167 of the jockey wheel arm 164. The downlock biasing mechanism 212 induces the downlock mechanism 208 to maintain this locked position. The follower pin 168 is also captured in a slot 216 formed in a cam mechanism 214 that is pivotally attached to the roller sleeve 194.

As described previously, when the accessory towing apparatus 100 is drawn closer to the hitch assembly 200, the roller bearing 191 of the compression latch mechanism 190 engages the ramp receiver bracket 246 compressing the roller sleeve 194 into the sleeve housing 198. With reference to in FIG. 11*b*, as the roller sleeve 194 is compressed into the sleeve housing 198, the cam mechanisms 214 are also pushed further into the sleeve housing 198. The follower pin 168 travels along each cam slot 216 it is captured within. Eventually, the pivot bolt 218 of the cam mechanisms 214 engages the detent 211 of the downlock mechanism 208. As the roller sleeve 194 is further compressed into the sleeve housing 198, the pivot bolt 218 further engages the detent 211 causing the downlock mechanism 208 to rotate so as to release the follower pin 168 from the locking notch 213.

Figure 11C:
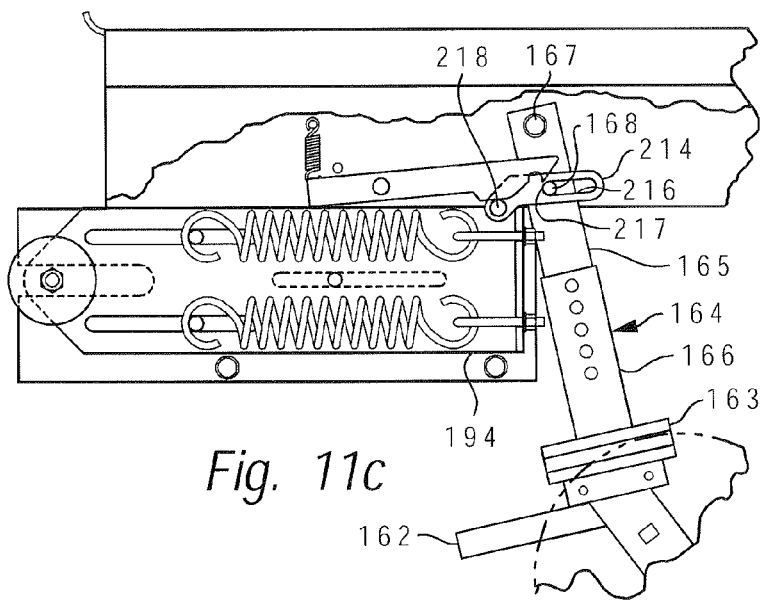

With reference now to FIG. 11*c*, as the roller sleeve 194 is further compressed into the sleeve housing 198, the follower pin 168 continues to travel along the cam slot 216 until eventually reaching a rear wall 217 of the cam slot 216, whereupon the cam mechanisms 214 begin to transfer the compression force to the follower pin 168, thereby inducing a torquing moment on the jockey arm assembly causing it to rotate about its pivot point 167.

Figure 11D:
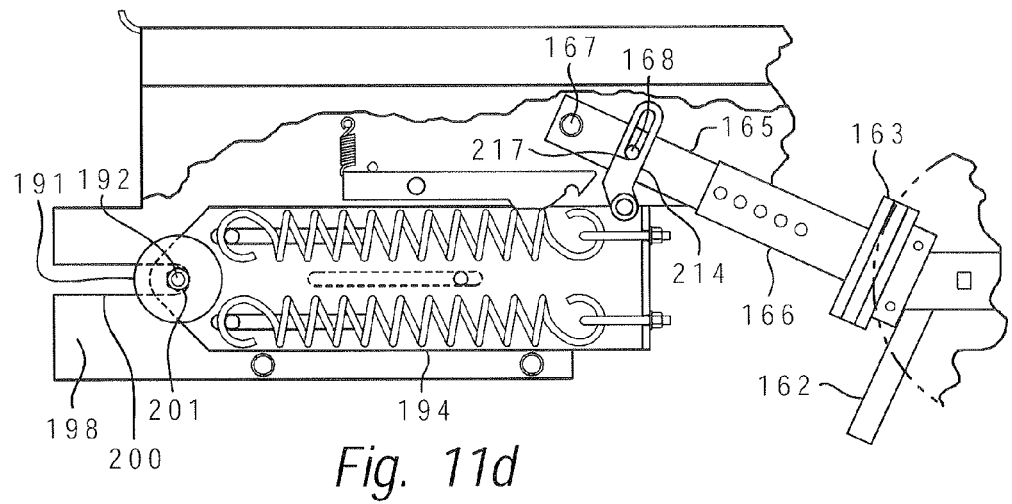

As shown in FIG. 11*d*, as the roller sleeve 194 continues to be compressed into the sleeve housing 198, the compression force is transferred to the follower pin 168 via the cam mechanisms 214, causing the jockey wheel assembly to further rotate and retract towards the linkage arm. A counter-weight auto center mechanism 162 attached to the jockey wheel assembly may be utilized to bias the alignment of the jockey wheel 160 as it is retracted. As noted previously, the compression latch mechanism 190 is eventually compressed into the sleeve housing 198 until the center pin bolt 192 impinges on the rear wall 201 of the alignment slot 200. At this point, the roller bearing 191 is fully seated in the notch 247 and the ramp receiver bracket 246 is captured laterally between the walls of the sleeve housing 198. Correspondingly, the jockey wheel assembly is fully retracted and held in place by the relative position of the compression latch mechanism 190 within the sleeve housing 198.

The compression latch mechanism is biased as it is compressed into its sleeve housing, so that when the accessory towing apparatus is disengaged from the towing vehicle, the compression latch mechanism automatically expands out of its sleeve housing, thereby causing the jockey wheel assembly to automatically extend. It is noted that the biasing mechanism 204 of the compressive latch mechanism 190 provides a biased force by which the system automatically extends the jockey wheel assembly as the accessory towing apparatus 100 is separated from the hitch assembly 200 in reverse of the sequence depicted from FIGS. 11*a*-*d*.

It will now be evident to those skilled in the art that there has been described herein an improved trailer towing system for towing gooseneck-type trailers, which enhances the utility, stability and safety of the hitched vehicle and trailer.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

The invention claimed is:

1. An accessory towing apparatus for linking a vehicle and a gooseneck trailer, comprising in combination:
    an axle assembly having a plurality of ground engaging wheels disposed thereon;
    a framework attached to said axle assembly, said framework having three linkage arms extending therefrom and a hitch mechanism mounted thereon, said hitch mechanism being operable for coupling said trailer to said framework; wherein each of said linkage arms is operable to pivotally connect to said vehicle; and
    an alignment and attachment system having a yoke assembly slidably coupled to a first and second outboard linkage arms, said yoke assembly connected to a winch mechanism attached to said framework and having two alignment chains extending therefrom, wherein when said alignment chains are attached to said vehicle, said system is operable for centering said linkage arms on rear of said vehicle and drawing said towing apparatus towards said vehicle.

2. The accessory towing apparatus of claim 1, wherein said linkage arms are substantially parallel to one another.

3. The accessory towing apparatus of claim 1, wherein said linkage arms are operable to pivotally connect to said vehicle along a substantially common axis.

4. The accessory towing apparatus of claim 1, wherein each of said linkage arms includes a distal end having a latching mechanism incorporated therein and operable to pivotally connect to said vehicle.

5. The accessory towing apparatus of claim 4, further comprising a receiver hitch mechanism attached to said vehicle, said receiver hitch mechanism comprising a framework attached to a main frame of said vehicle, having three receiver boxes, which are each operable for receiving a receiver bracket that corresponds to one of said latching mechanisms.

6. The accessory towing apparatus of claim 4 wherein each of said latching mechanisms comprise a gate latch mechanism operable to pivotally attach to a gate rod assembly connected to said vehicle.

7. The accessory towing apparatus of claim 4, wherein said latching mechanisms comprise at least one gate latch mechanism and one compression latch mechanism.

8. The accessory towing apparatus of claim 7, wherein said compression latch mechanism includes a roller bearing operable to engage a ramp bracket connected to said vehicle.

9. The accessory towing apparatus of claim 7, further comprising a cam mechanism pivotally attached to said compression latch mechanism, said cam mechanism connecting said compression latch mechanism to a jockey wheel assembly, which is pivotally attached to one of said linkage arms, wherein said cam mechanism induces a torquing moment on said jockey wheel assembly as said roller bearing engages said ramp bracket.

10. The accessory towing apparatus of claim 1, wherein said hitch mechanism comprises a ball hitch mechanism.

11. The accessory towing apparatus of claim 1, wherein said hitch mechanism comprises a fifth-wheel hitch.

12. The accessory towing apparatus of claim 1, wherein said hitch mechanism is mounted on a saddle attached to a first and second longitudinal rail of said framework.

13. The accessory towing apparatus of claim 12, wherein said saddle is selectively attached to said longitudinal rails of said framework.

14. The accessory towing apparatus of claim 12, wherein said saddle further includes a structural extension framework that vertically extends said hitch mechanism above said saddle.

15. The accessory towing apparatus of claim 1, wherein said wheels are fixably aligned with said axle assembly.

16. The accessory towing apparatus of claim 1, wherein said axle assembly comprises a dynamically aligned axle assembly.

17. The accessory towing apparatus of claim 1, wherein said axle assembly further comprises a power take off mechanism connected to an accessory power mechanism.

18. The accessory towing apparatus of claim 17, wherein said accessory power mechanism is a hydraulic pump.

19. The accessory towing apparatus of claim 17, wherein said accessory power mechanism is an electrical generator.

20. An apparatus for aligning a towing vehicle and a trailer device, comprising
- a yoke assembly slidably coupled to a first and second outboard linkage arms extending from said trailer device; said yoke assembly including
  - a first sleeve device slidably coupled to said first outboard linkage arm, said first sleeve device having a first alignment chain extending therefrom,
  - a second sleeve device slidably coupled to said second outboard linkage arm, said second sleeve device having a second alignment chain extending therefrom and
  - a lateral crossbar connecting said first and second sleeve devices; and
- a winch mechanism attached to said trailer device, said winch mechanism having a cable connected to said lateral crossbar of said yoke assembly wherein when said alignment chains are attached to said vehicle and said winch mechanism is engaged, said apparatus centers said trailer device on rear of said towing vehicle while drawing said trailer device towards said towing vehicle.

* * * * *